United States Patent [19]

Bühler

[11] Patent Number: 5,688,205
[45] Date of Patent: Nov. 18, 1997

[54] MOTOR VEHICLE DRIVE DEVICE

[75] Inventor: Roger Bühler, Le Locle, Switzerland

[73] Assignee: SMH Management Services AG, Biel, Switzerland

[21] Appl. No.: 580,963

[22] Filed: Dec. 27, 1995

[30] Foreign Application Priority Data

Dec. 28, 1994 [FR] France .................. 94 15758

[51] Int. Cl.$^6$ ...................................... B60K 41/04
[52] U.S. Cl. ..................... 477/110; 477/107; 477/124; 74/336 R
[58] Field of Search ................ 477/107, 110, 477/124, 125, 129; 74/335, 336 R

[56] References Cited

U.S. PATENT DOCUMENTS

| | | | |
|---|---|---|---|
| 4,414,863 | 11/1983 | Heino | 477/131 X |
| 4,493,228 | 1/1985 | Vukovich et al. | 477/110 X |
| 4,627,312 | 12/1986 | Fujieda et al. | 477/124 |
| 4,782,714 | 11/1988 | Schletzbaum et al. | 74/331 X |
| 4,817,470 | 4/1989 | Muller et al. | 477/124 X |
| 4,947,681 | 8/1990 | Young | 73/118.1 |
| 5,048,374 | 9/1991 | Miyake et al. | 477/125 |
| 5,085,095 | 2/1992 | Lasoen | 74/335 X |
| 5,133,227 | 7/1992 | Iwatsuki | 477/110 |
| 5,239,894 | 8/1993 | Oikawa et al. | 477/107 |
| 5,282,399 | 2/1994 | Sano et al. | 477/904 X |
| 5,301,565 | 4/1994 | Weismann et al. | 74/336 R |
| 5,366,424 | 11/1994 | Wataya | 477/107 |
| 5,409,433 | 4/1995 | Nishigaki et al. | 477/108 |

FOREIGN PATENT DOCUMENTS

| | | |
|---|---|---|
| 037 639 | 10/1981 | European Pat. Off. . |
| 391 604 | 10/1990 | European Pat. Off. . |
| 490 627 | 6/1992 | European Pat. Off. . |
| 573 901 | 12/1993 | European Pat. Off. . |
| 654 624 | 5/1995 | European Pat. Off. . |

*Primary Examiner*—Khoi Q. Ta
*Assistant Examiner*—Peter T. Kwon
*Attorney, Agent, or Firm*—Griffin, Butler Whisenhunt & Kurtossy

[57] ABSTRACT

A drive device comprises a gearbox (1) of the motorcycle type in which a selector shaft (10), via its angular position, enables the gear ratio in which the gearbox will be engaged to be determined. The device is provided with an electronic control device (DCE) designed to automatically place the gearbox (1), or in other words the selector shaft (10), in the position corresponding to the gear selected by the driver or automatically determined as a function of the speed of the vehicle. The electronic control device (DCE) comprises, in particular, means for down-shifting gently despite the absence of a synchronizer in the gearbox.

10 Claims, 20 Drawing Sheets

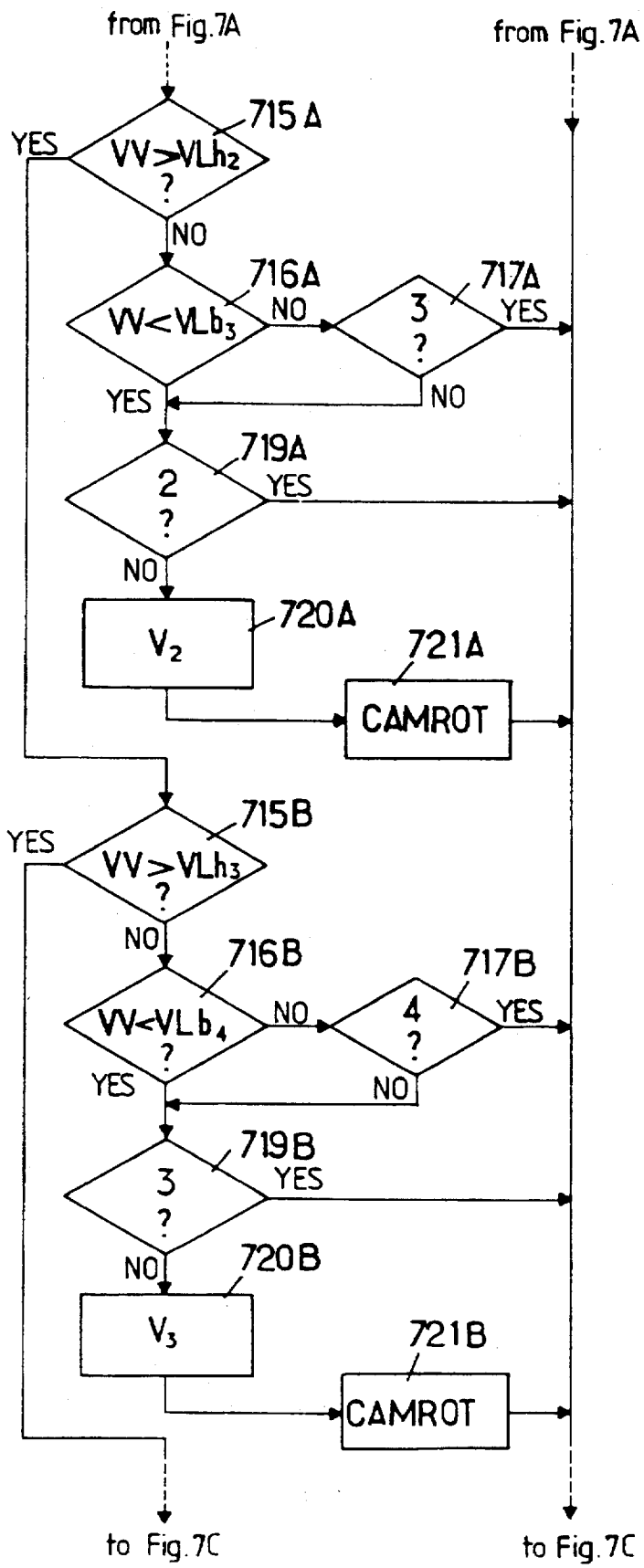

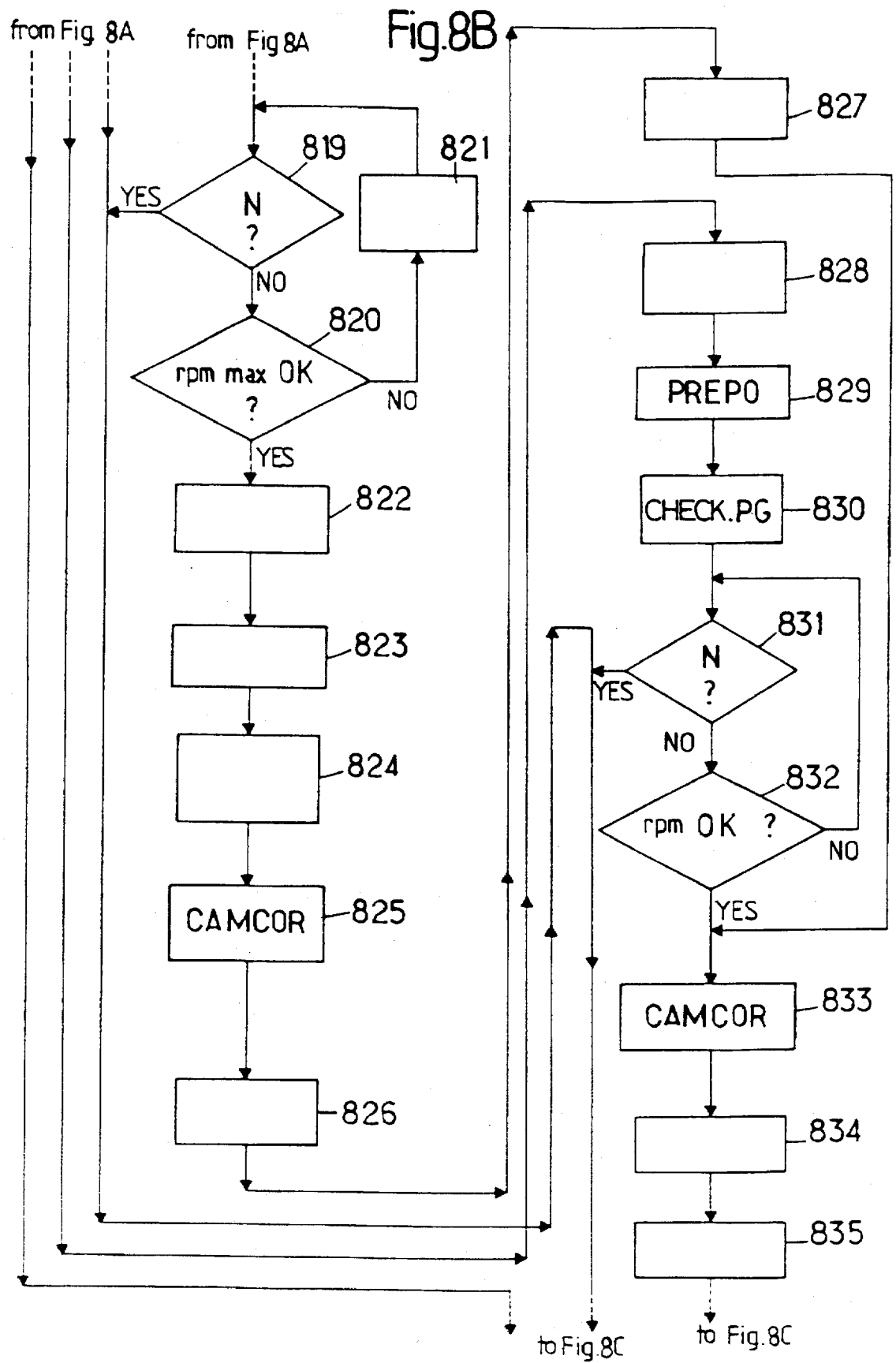

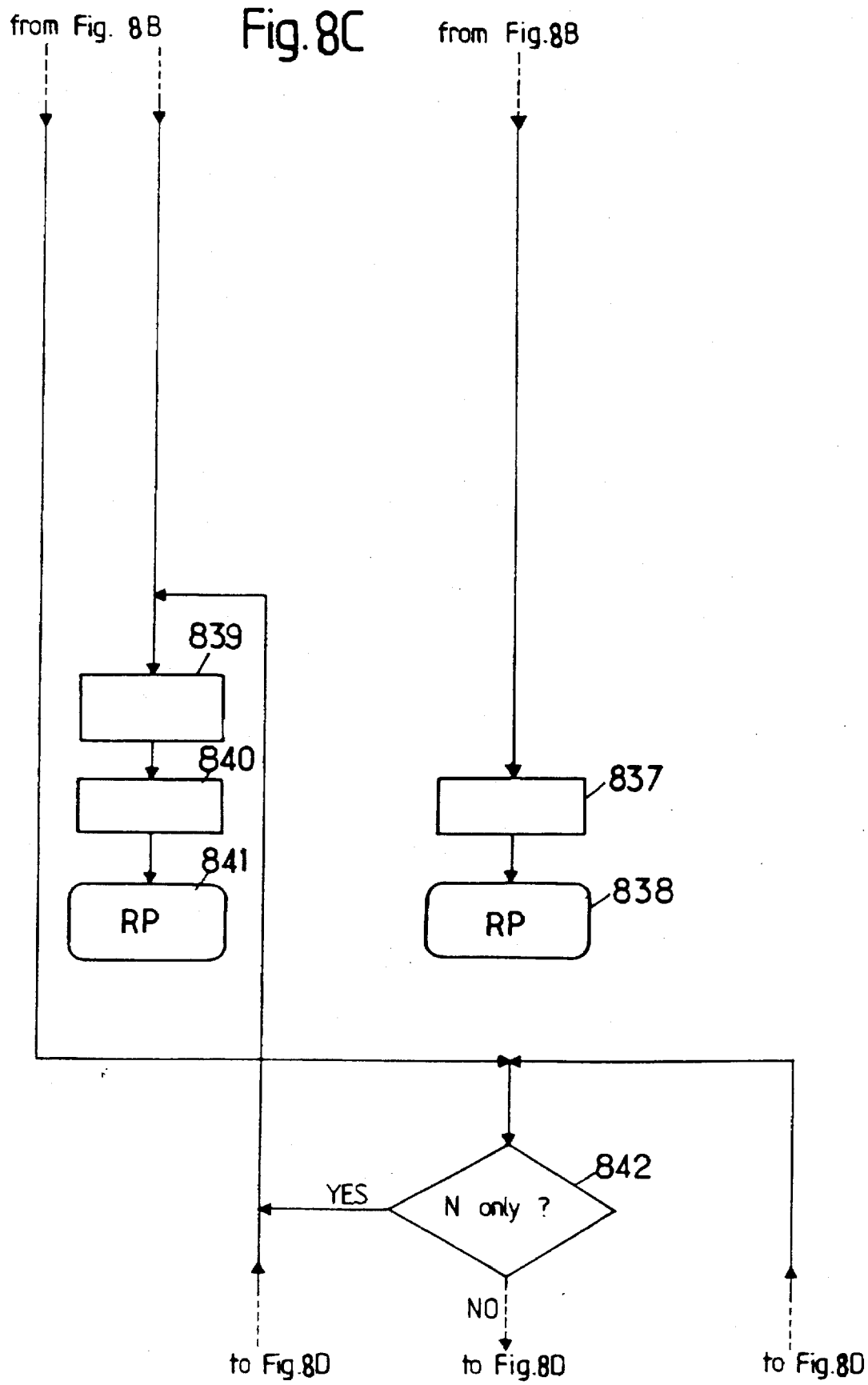

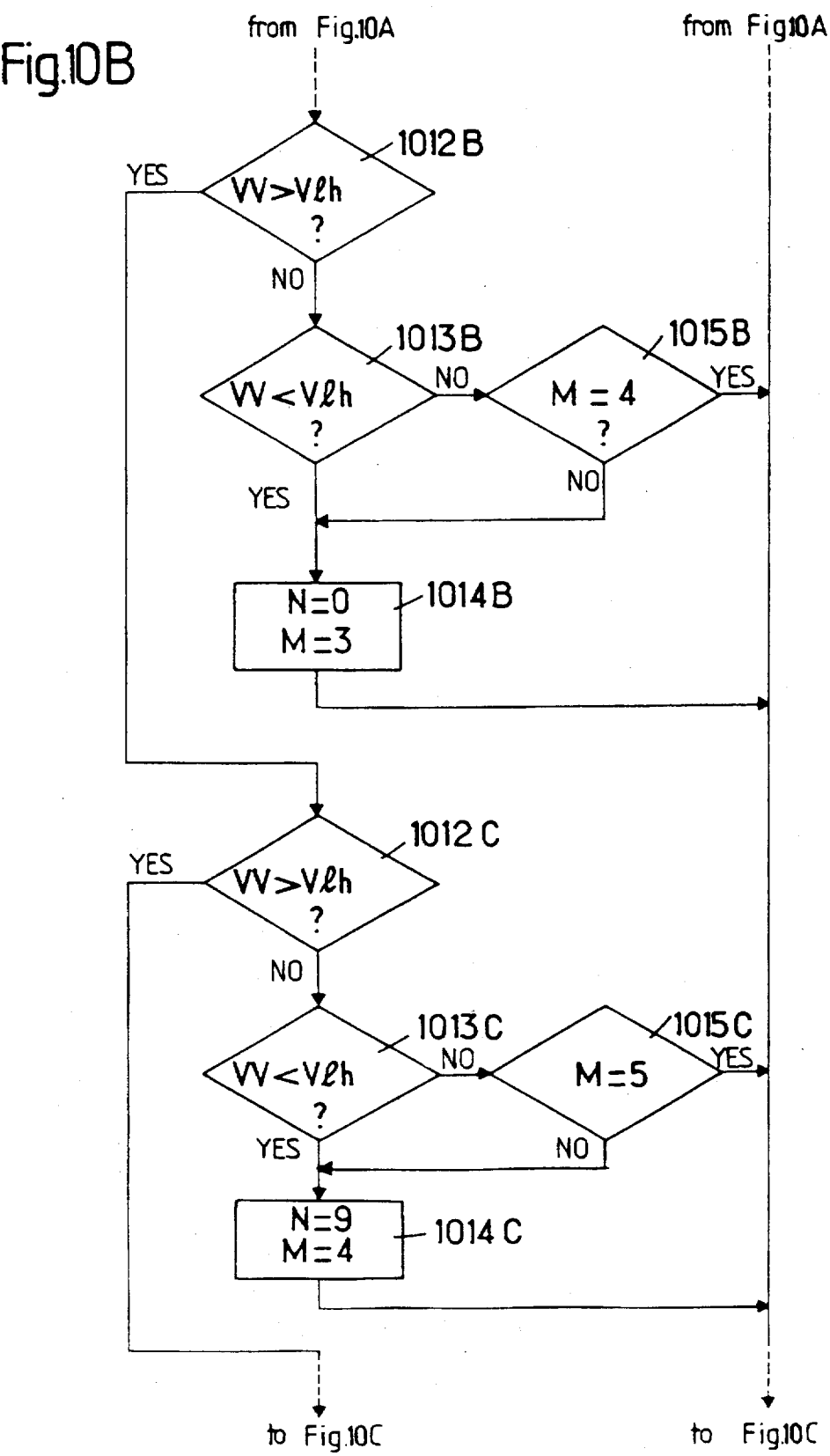

1

MOTOR VEHICLE DRIVE DEVICE

FIELD OF THE INVENTION

The present invention relates to a drive device for a motor vehicle comprising an arrangement of an internal combustion engine and a gearbox of the type usually used for motorcycles.

BACKGROUND OF THE INVENTION

It is known that gearboxes for motorcycles do not generally comprise synchronizing devices which, during a shift in gear ratio, enable the primary shaft and the secondary shaft to turn at speeds adapted in such a way that the gear ratio shift can take place without any resulting damage to the pinions which have to be meshed. These synchronizing devices are usual in motor vehicle gearboxes. However, for reasons of bulkiness and weight, motorcycles are not generally equipped with them.

French patent application no. 93 13768 of 18 Nov. 1993, which is the priority application of U.S. Pat. No. 5,542,309 granted Aug. 6, 1996 and assigned to the same assignee as the present application, proposed a gearbox which is of the motorcycle type, but adapted to a motor vehicle, in particular to small cars for town use, this patent application disclosing a particularly adequate solution for the mechanical design of the gearbox which makes it particularly flexible to use. In particular, this solution enables one to shift from any gear ratio into any other gear ratio, which is not usually possible with conventional gearboxes of this type. For further details, refer to the description of said patent application.

SUMMARY OF THE INVENTION

An object of the present invention is to provide a drive device for a motor vehicle such as a small car for town use, comprising in particular an internal combustion engine and a motorcycle type gearbox provided with an automatic control device, enabling the driver of the vehicle equipped with it to choose whether to make the gearbox operate either entirely automatically or manually.

The invention thus concerns a motor vehicle drive device comprising:

an internal combustion drive engine whose revs can be controlled via an accelerator pedal; and a transmission, said transmission comprising:

a gearbox, a torque converter and a clutch coupled between said engine and said gearbox, said gearbox being of the type in which the gear ratio shifts are carried out without the aid of synchronizers, this gearbox comprising a primary shaft, a secondary shaft, sets of pinions respectively wedged on said shafts to be selectively engaged in order to assure the establishment of the gear ratios, the engaging and disengaging movements of the pinions being assured via a mechanical switching device comprising a gear ratio selector shaft whose predetermined angular positions constitute alternatively neutral disengaged positions of said pinions and selective engaged positions of said pinions for establishing the gear ratios of said gearbox, the mechanical switching device also comprising a control shaft cooperating with said selector shaft to enable the selection to be made from any previous gear ratio to any subsequent gear ratio, and an electronic gearbox control device, this drive device being characterised in that it also comprises:

means for rapidly increasing the revs of said internal combustion engine independently of the control exercised via said accelerator pedal and in that, with a view to the down-shifting of said gearbox, said electronic control device comprises:

means for placing said selector shaft in one of said neutral positions, means for temporarily actuating said means for rapidly increasing the revs, means for monitoring said revs, and means for preventing said selector shaft from moving to the lower gear ratio position except when the revs reach a value compatible with said lower gear ratio.

It follows from these features that, despite the simplicity of the gearbox which lacks any synchronizers and is thus of a light and particularly robust construction, the gear ratio selection can be made without any particular difficulty for the driver of the vehicle. Furthermore, as a result of the features of the invention, the gearbox automatically shifts gear ratios, although it is possible for the gear ratio selection to be made manually. However, the gearbox control design recommended by the invention enables the gearbox to be operated entirely automatically which gives the driver of the vehicle maximum driving comfort.

Other features and advantages of the invention will appear during the description which follows, given solely byway of example and made with reference to the attached drawings

DESCRIPTION OF A PREFERRED EMBODIMENT

Figure 1:
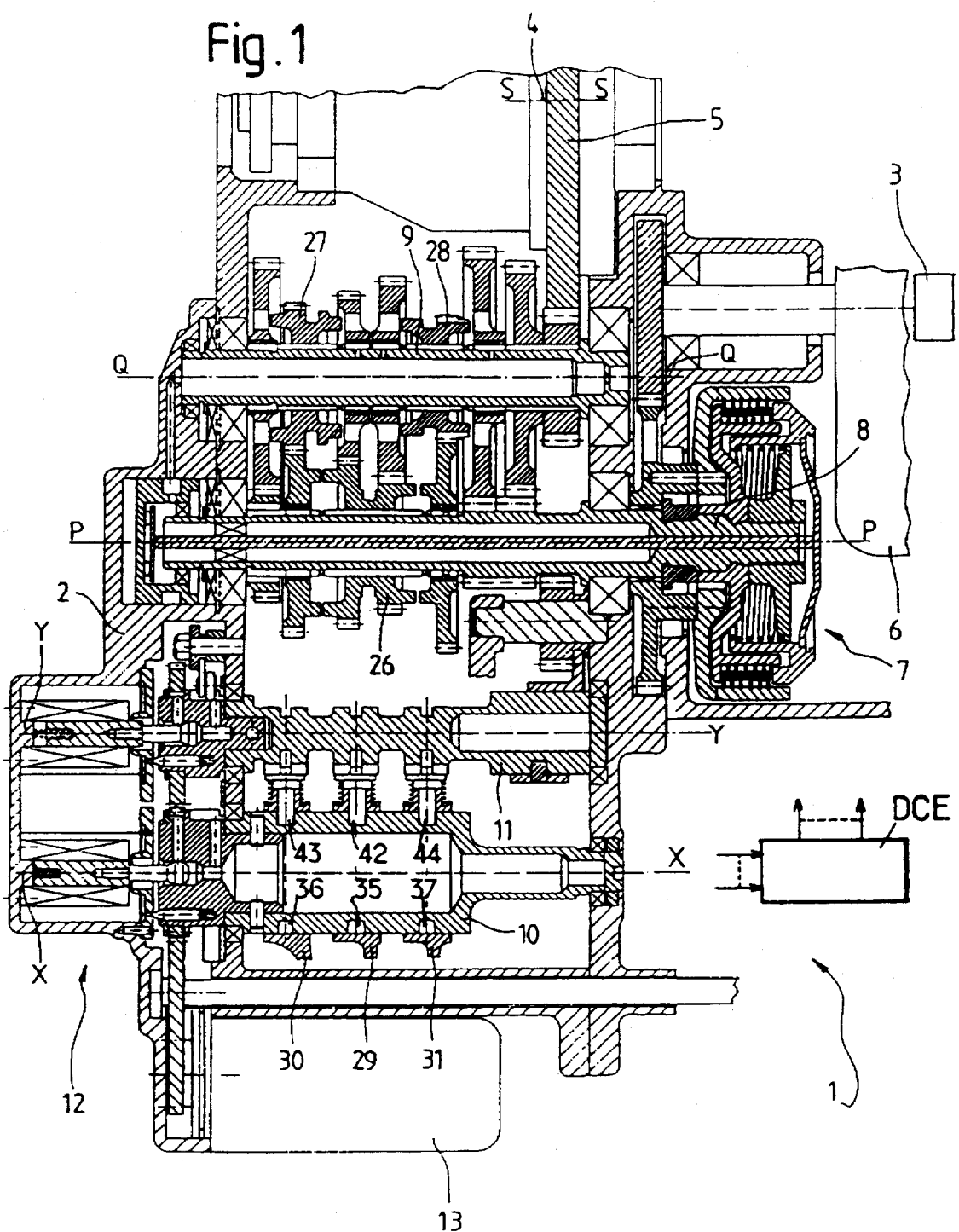
FIG. 1 shows schematically a motor vehicle drive device designed according to the invention, the figure showing in particular a cross-sectional view of a motorcycle type gearbox, modified in accordance with the concepts of the above cited patent application, and capable of being controlled by an electronic control device designed according to the present invention.

FIG. 1 shows a preferred embodiment of the gearbox according to the invention disclosed in the afore-cited patent application, designated here by the general reference 1. Furthermore, in the brief description of said gearbox which will be given below, the numerical references given in FIG. 1 of said patent application have been used to designate the same constructive components of the gearbox.

This being so, it can be seen that the latter is housed in a casing 2 and is intended to assure, with a variable transmission ratio, the transmission of a movement of rotation from a drive engine 3 to an output shaft 4 of axis S—S of an output cogwheel 5.

The kinematic chain interposed between drive engine 3 and output shaft 4 comprises in succession; torque converter 6, clutch 7, a primary shaft 8 of axis P—P and a secondary shaft 9 of axis Q—Q. The absence of synchronizers in this construction will be noted. Further, the torque converter may be removed from the kinematic transmission chain by a directly engagable coupling which is inactive only when the gearbox gear ratios are shifted.

The gearbox also comprises a selector shaft 10 of axis X—X for controlling the gear ratio selection, a decoupling shaft 11 of axis Y—Y for controlling the free selection of the gear ratios and reverse gear, a unit 12 for controlling these two shafts 10 and 11 and a control motor 13.

In the example disclosed, gearbox 1 has six gear ratios which are obtained by the selective actuation of three sliding sleeves 26, 27 and 28, mounted respectively on primary shaft 8 and secondary shaft 9. These sliding sleeves cooperate with forks 29, 30 and 31 which are rotatably mounted on shaft 10, on which said forks can also slide laterally as a result of guide grooves 35, 36 and 37 in which counter-cams 42, 43 and 44 are guided.

As described in detail in the afore-cited patent application, counter-cams 42, 43 and 44 may be taken out of their respective guide grooves in a predetermined position (at 112° in the example described) of decoupling shaft 11 thereby making it possible to select any gear ratio, whatever the gear ratio in which the gearbox was previously engaged.

The rotation of shafts 10 and 11 is achieved by control unit 12 and drive motor 13, it being understood that control unit 12 enables the shafts to be rotated at predefined angles corresponding to the different gear ratios to be selected (shaft 10) and to the reverse gear and release from rotation of shaft 10 (shaft 11) positions respectively. It is to be noted that control unit 12 and motor 13 may be replaced by other control assemblies assuring the rotation of the two shafts 10 and 11. Further details concerning the construction and operation of the gearbox can be obtained by referring to the afore-cited patent application.

In the following description of the present invention, it will be admitted that shafts 10 and 11 are driven directly by two drive motors which are respectively directly coupled to said shafts and which are shown schematically only in FIG. 2. They carry the references 51 and 52 respectively. FIG. 1 also shows schematically, by an operational block, the electronic control device DCE which is used with this gearbox, a device which is provided with a certain number of inputs and outputs connected to the different members of the gearbox.

Figures 2, 2A:
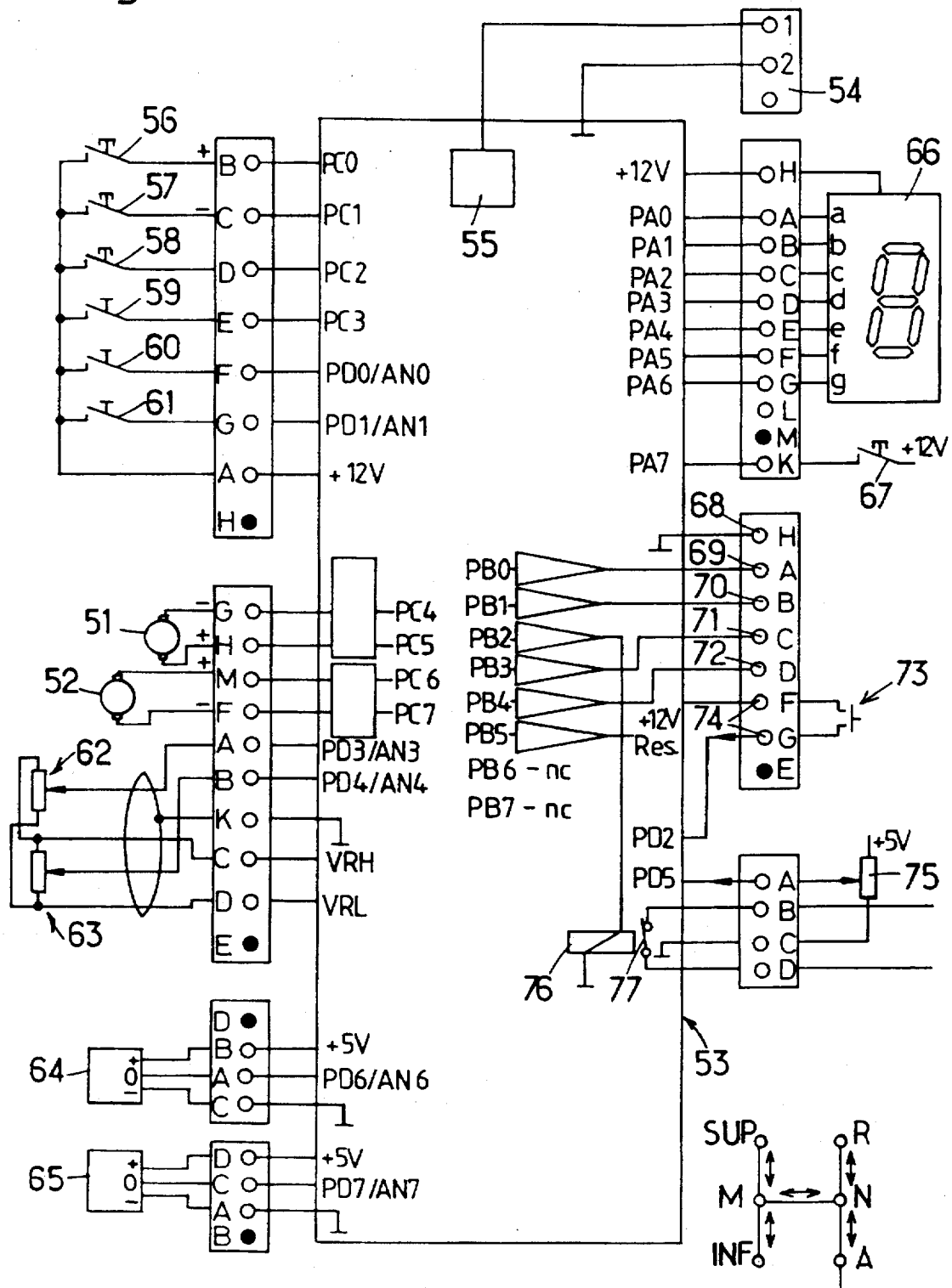
FIG. 2 is a general electric diagram of the control device according to the invention.
FIG. 2A shows schematically the positioning grid of the gearbox control lever.

Referring now specifically to FIG. 2, the automatic control device according to the present invention will be described in more detail. This device comprises a microprocessor 53 which may be of any suitable type available on the market. A particularly suitable microprocessor is that sold under the reference MC68HC805B6.

The peripheral members of this microprocessor 53 are, first of all, motors 51 and 52 already mentioned above which receive the main output signals from said microprocessor.

It is supplied by a battery 54 which provides it with its energy through a filter 55 enabling the supply voltage interference to be removed.

Microprocessor 53 also receives several signals informing it of the state of a control lever which is at the disposal of the driver of the vehicle equipped with the gearbox according to the invention. This lever is preferably arranged under the steering wheel so as to be able to be easily actuated by the driver of the vehicle.

FIG. 2A shows the positioning grid of the gearbox control lever. It can be seen that it has more or less the shape of an H, of which one of the vertical branches defines at its ends respectively the up-shifting and down-shifting control positions (marked SUP and INF), these positions being transitory. The intermediate position of this branch defines the manual control M of the gearbox and it is stable. The other vertical branch of the H is a little longer and defines opposite position M, neutral control N, at one of its ends reverse gear control R, at an intermediate position fully automatic control A and at the end of this branch, parking control P. All of these positions of this branch of the H are stable.

These positions are associated with switches which close when the driver places them in a corresponding position. Thus, switch 56 closes when the driver wishes to select a higher gear ratio than that in which the gearbox is engaged (position SUP). Likewise, a switch 57 closes when the driver wishes to select a lower gear ratio (position INF). A third switch 58 closes when the vehicle parking brake is applied (position P). A switch 59 is closed when the gearbox is in neutral position N (neutral). A switch 60 is closed when the driver selects reverse gear (position R). Finally, a switch 61 is closed when the driver wishes to drive fully automatically (position A). Position M is established by default.

The microprocessor also receives data relating to the angular position of shafts 10 and 11 as a result of respective potentiometers 62 and 63 whose cursors are coupled respectively to motors 51 and 52. Data as to the speed of engine 3 is also provided to microprocessor 53 by a sensor 64, while a sensor 65 provides data as to the speed of the vehicle itself.

The driver of the vehicle is informed of the position of the gearbox by microprocessor 53 via a display device 66 appearing for example on the dashboard of the vehicle and indicating by means of a figure in particular the gear in which the gearbox is engaged.

A switch 67 is provided for controlling the starting of engine 3 of the vehicle.

A terminal 68 is intended to connect microprocessor 53 to the potential of earth. A terminal 69 produces a signal enabling the operation of the alternator coupled to the vehicle engine to be controlled. A terminal 70 provides a signal which controls an electrovalve for engaging and disengaging clutch 7. A control signal for an auxiliary mobile flap which will be described in more detail below, appears at a terminal 71. Terminal 72 is intended to provide a starting control signal. An oil pressure checking switch 73 in particular for the clutch control, is connected to terminals 74 of microprocessor 53.

A potentiometer 75 is coupled to the accelerator pedal of the engine for providing data as to the position of said pedal.

Finally, a relay 76 controlled by microprocessor 53 enables, by acting on a switch 77, the flow of fuel to engine 3 of the vehicle to be controlled and, if necessary, for this flow to be cut off, in particular during certain gear ratio shifts of the gearbox, as will be seen below.

One of the characteristics of the gearbox disclosed in the afore-cited patent application consists of the absence of synchronizers, which gives it its simplicity and lightness. However, it is known that a gearbox of this type usually requires certain care or even dexterity on the part of the driver, for the gear ratio shifts to be able to be made gently and without damaging the gearwheels of the gearbox. Experienced drivers achieve this result by carrying out what is known as "double declutching". As is known, this process consists, for each gear ratio shift, of disengaging the clutch, shifting into neutral, adapting the engine revs with the aid of the accelerator pedal, engaging a new gear, then engaging the clutch in order to continue driving in the new gear ratio.

It is clear that this process which necessitates a certain dexterity on the part of the driver, is not suited to widely used vehicles and even less to vehicles with automatically controlled gears, required to be driven by persons unfamiliar with mechanical problems.

The control device of the present invention enables the gear ratio shifts to be carried out manually or entirely automatically, without this operation requiring any particular dexterity on the part of the driver despite the absence of synchronizers in the gearbox.

Figure 3:
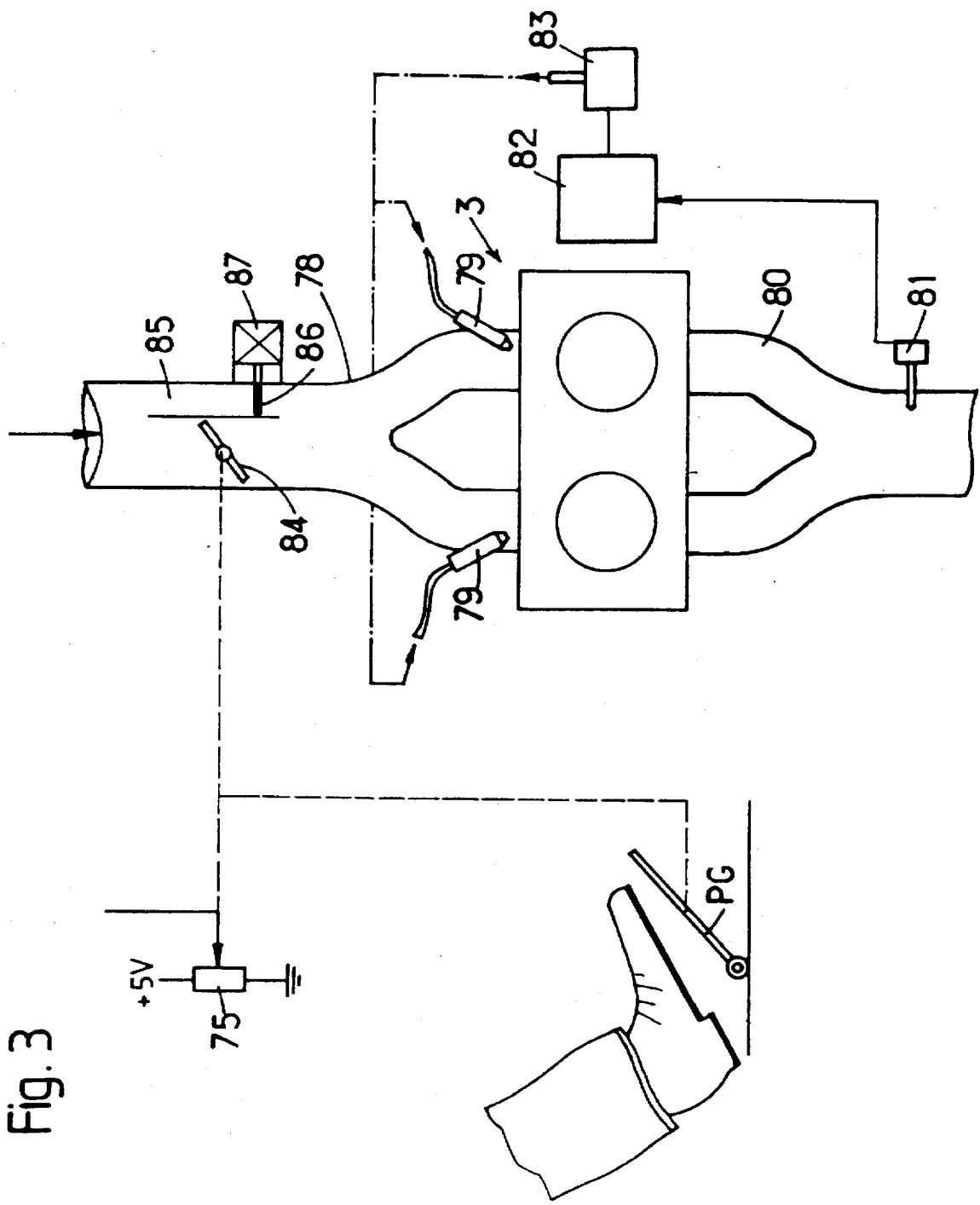
FIG. 3 shows schematically certain adaptations of the internal combustion engine required for the implementation of the invention.

Reference will now be made to FIG. 3 which shows in a very schematic manner the supply system of engine 3. The latter is provided with an air inlet manifold 78 in which two fuel injectors 79 are provided, the engine comprising, by way of example, two cylinders. It is also provided with an exhaust manifold 80 in which a "lambda" sounding rod 81 is placed enabling the exhaust gases produced by the engine to be analysed. Sounding rod 81 is connected to an ignition and injection control circuit 82 which controls in particular the operation of a fuel injection pump 83 connected to injectors 79.

A throttle valve 84 is arranged in inlet manifold 78 and mechanically connected to the accelerator pedal PG and to potentiometer 75 which supplies microprocessor 53 with data as to the position of the pedal, and, consequently, of throttle valve 84. At the place where the throttle valve is situated in inlet manifold 78, a by-pass passage 85 is provided in which the mobile flap 86 of an electrovalve 87 is provided, capable of being energized from the output 71 of microprocessor 53.

When electrovalve 87 is operated, passage 85 is open, which admits an additional quantity of air to engine 3 compared to that already admitted by throttle valve 84, which weakens the mixture. A reaction immediately results at "lambda" sounding rod 81 which then provides a signal to ignition control circuit 82. The latter, in turn, gives the command to fuel injection pump 83 to increase the flow of injectors 79, which then results in a rapid increase in the revs of engine 3.

A gearbox control algorithm implemented in microprocessor 53 will now be described by way of a preferred embodiment of the invention. The description will be made with the aid of the flow diagrams of FIGS. 4 to 11.

Figure 4:
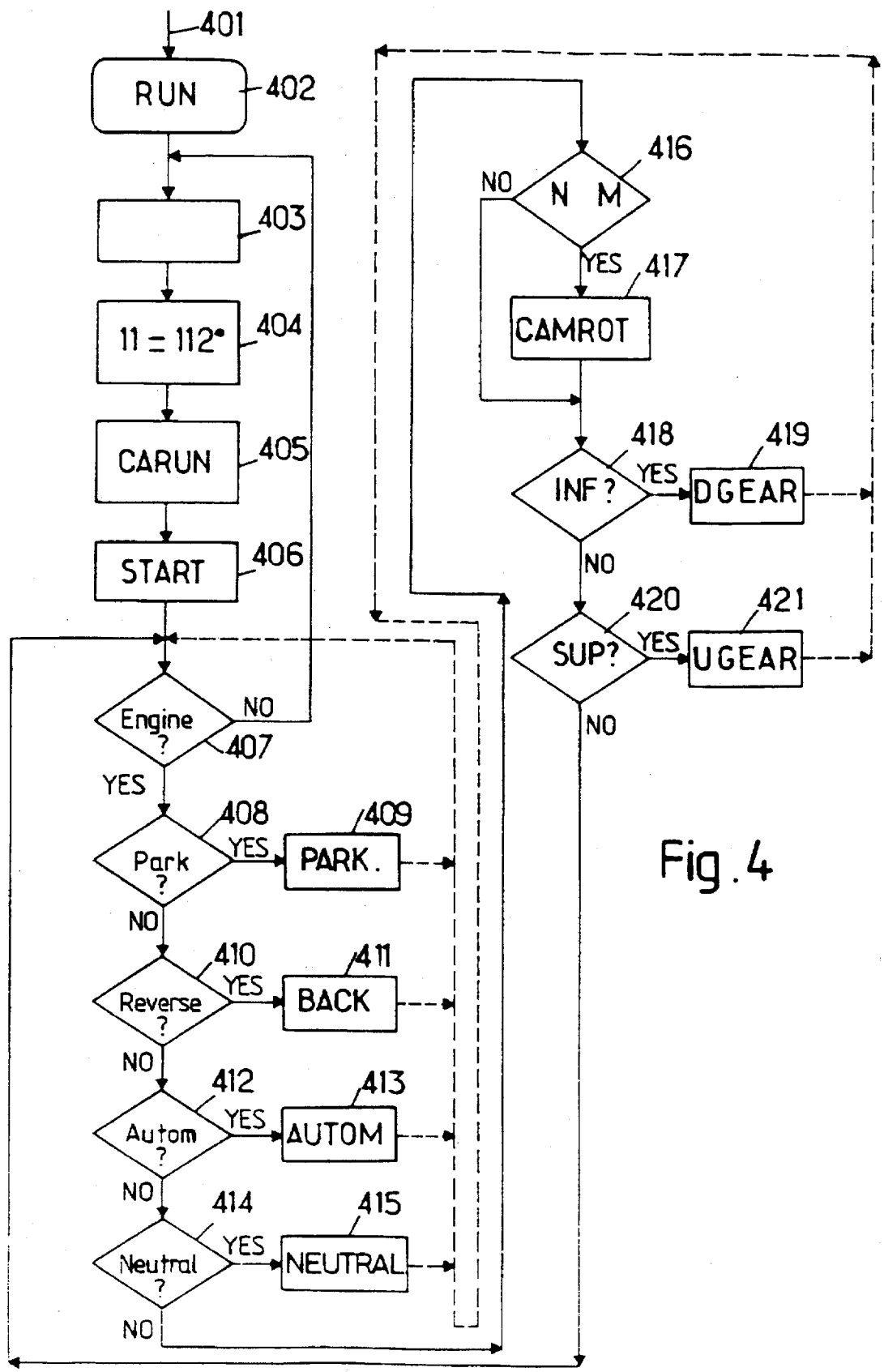
FIG. 4 is a flow diagram of the main programme used in the electronic control device according to the invention.

FIG. 4 shows the main programme on which several sub-programmes are grafted, the main ones of which, which are important to the understanding of the invention, will be described with reference to the following figures.

The main programme begins in 401 with a sub-programme 402 for initialising the components of the control device. This sub-programme is started as soon as the driver has turned the vehicle ignition key. In 403, the programme checks the position of clutch 7 to verify whether it is correctly engaged. It is to be noted that this clutch is normally engaged and that the control device will disengage it only when a gear ratio shift is ordered. The operation carried out in 404 is intended to place shaft 11 in the position corresponding to that in which counter-cams 44 are raised to release shaft 10. The latter is placed in its neutral position as a result of the execution in 405 of a sub-programme CARUN which will be described in more detail below with reference to FIGS. 5A and 5B.

The main programme then passes to a sub-programme START in 406 which controls the starting procedure of engine 3. Since this procedure is conventional it will not be described in detail.

In 407, a test is carried out to determine whether engine 3 has actually started. If so, the main programme passes to the next step; if not it returns to operation 403.

In 408, the main programme checks whether the parking brake is applied. If so, the programme enters sub-programme PARK in 409 in order to actuate the handbrake. This sub-programme has no peculiarities and will not therefore be described in detail.

In 410, the main programme carries out a test to check whether reverse gear R has been selected on the. control lever. If so, the programme enters, in 411, a sub-programme BACK which will be described in detail below with reference to FIGS. 6A and 6B.

In 412, the main programme carries out a test to check whether the control lever is placed in automatic position A. If so, the programme enters, in 413, a sub-programme AUTOM which will be described below with reference to FIGS. 7A, 7B and 7C. If not, the programme passes to the next step.

The latter consists of testing, in 414, whether the gear lever is in neutral position N. If so, the programme passes into a sub-programme 415 called NEUTRAL intended to place the gearbox in one of the neutral positions. This sub-programme is described below with reference to FIGS. 10A, 10B and 10C.

If the result of the test in 414 is negative, the main programme passes to another test in 416 to check whether the control lever is placed in a gear ratio selection position. If so, the main programme passes in 417 into a sub-programme CAMROT enabling the gearbox to shift into a temporary gear ratio which is automatically determined as a function of the speed of the vehicle. Sub-programme CAMROT is described in detail below with reference to FIGS. 8A to 8D.

In the event that the test in 416 proves negative, the programme passes into 418 to check whether the control or gear ratio selector lever has been brought into down-shifting position INF. If so, the programme passes in 419 into a sub-programme DGEAR to switch into the lower gear ratio. This sub-programme is described in detail below with reference to FIG. 11. If, on the other hand, the test proves negative, the programme passes into 420 where a test is carried out to check whether the control lever has been brought into up-shifting position SUP. If so, the programme passes in 421 into a sub-programme UGEAR which assures the shift of the gearbox to the higher gear ratio.

If the test in 420 is negative, the main programme loops back to step 407. The same is true for sub-programmes PARK, BACK, AUTOM, NEUTRAL, DGEAR and UGEAR which, when they have been executed, loop back to step 407 of the main programme.

Sub-programme CARUN will now be described referring more particularly to FIGS. 5A and 5B. This sub-programme is executed when engine 3 is running and also during the execution of sub-programme NEUTRAL, as will be seen below. It enables, in particular, shaft 10 to be placed in a neutral position in which shaft 11 can withdraw counter-cams 42, 43 and 44 from the respective grooves of shaft 10 in order to the prepare the latter for free rotation to the desired position. In certain driving configurations, and also possibly when the vehicle is reversing, the angular position of shaft 10 may be such that the counter-cams are slightly jammed in the grooves and do not leave the latter, even if in theory the position of shaft 11 should enable this.

In order to understand the progress of sub-programme CARUN, it should be remembered that the gearbox according to the invention includes several neutral positions (five in the present case), which correspond to the intermediate positions of forks 29, 30 and 31 (FIG. 1) in which the latter hold selector rods 26, 27 and 28 between the pinions which they are intended to couple between them to engage the gear ratios.

It is also to be noted that the positions of shaft 10 which are eleven in number, are numbered conventionally from 1 to 6 for the gear ratios and from 7 to B (in hexadecimal) as regards the neutral positions, it being understood that the neutral position found between the positions situated between gear ratios 1 and 2 is designated by 0 and that the position between positions 1 and 6 is not used.

Each of these positions is represented by an angular value, these values being spaced at 30° intervals from each other. Furthermore, motor 51 may position shaft 10 by steps of approximately 1.3°, this value also representing the maximum resolution with which shaft 10 can be positioned.

In the example shown and described, sub-programme CARUN must thus be able to verify whether shaft 10 is in one of the six neutral positions, the verification being achieved by examining the angular position of shaft 10 with a certain degree of precision (approximately 5° either side of the nominal positions), which is done by measuring the potential of the cursor of potentiometer 62 (FIG. 2).

Figure 5A:
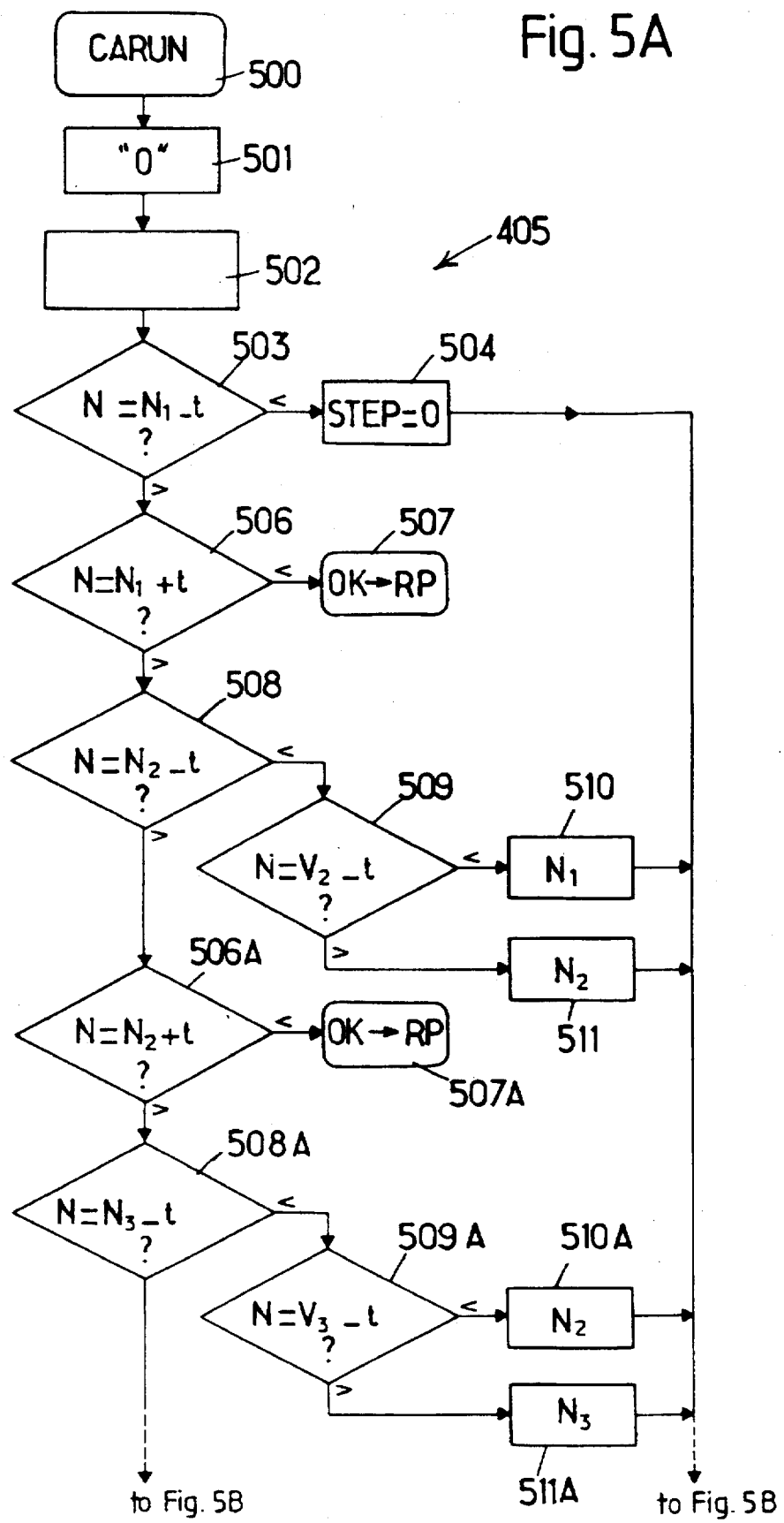
FIGS. 5A to 11 are flow diagrams of several subprogrammes executed during the course of the main programme illustrated in FIG. 4.
Figure 5B:
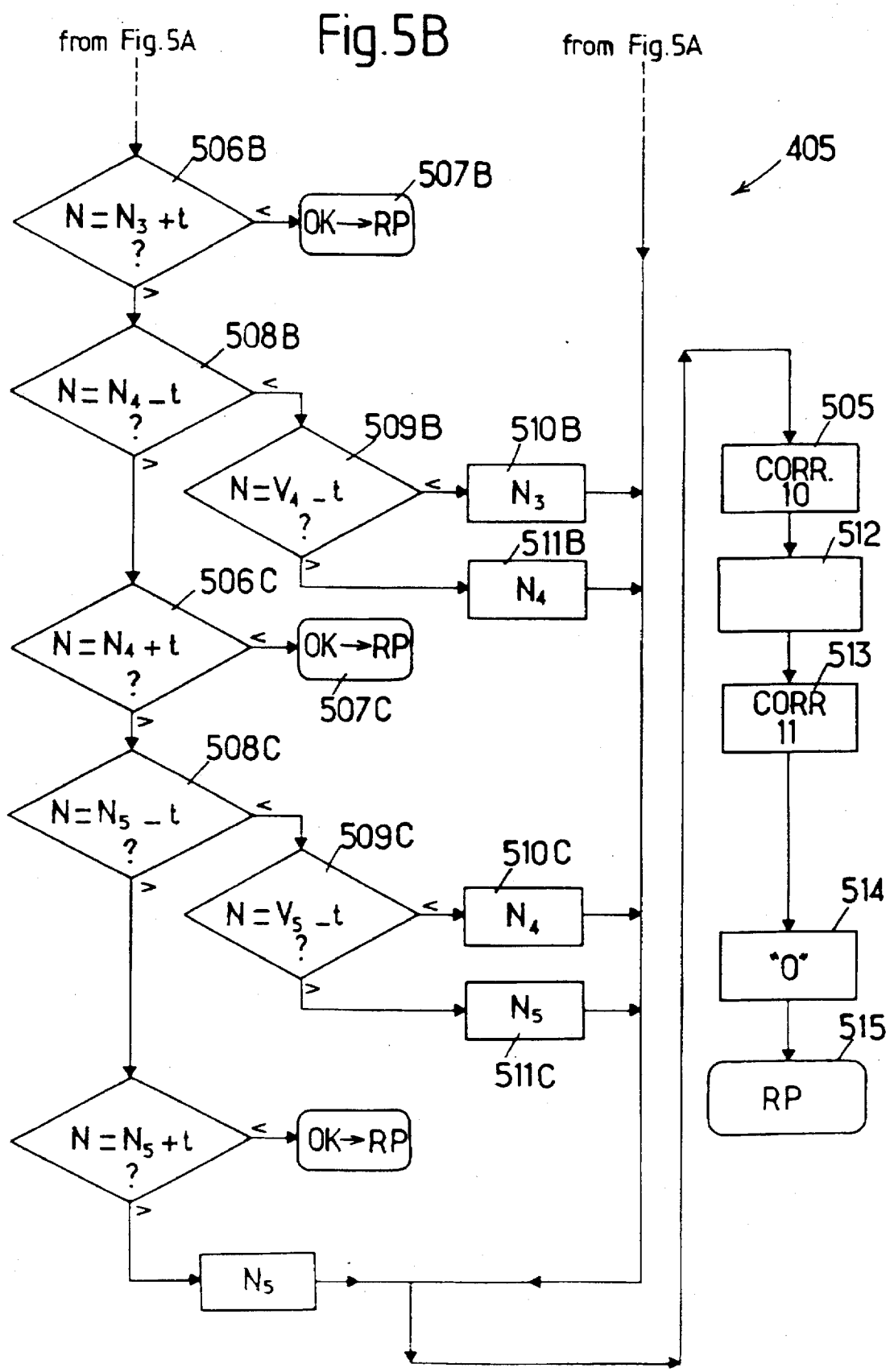

Sub-programme CARUN is initiated in 500 (FIG. 5A). In 501, the programme displays data on display 66 (in the present case a flashing "0") to indicate that the system is checking a possible blockage of shafts 10 and 11 and remedying said blockage.

In 502, the present angular value N of the position of shaft 10 is stored in a memory. Then, this value is examined during several tests to check whether it is within the predetermined tolerance limits around the nominal angular value of the neutral position in question.

Thus, a test is first carried out in 503 to determine whether the actual angular position of shaft 10 is lower or higher than the nominal value (30°) of the neutral position N1 between the positions corresponding to gear ratios 1 and 2 (0° and 60° respectively), less the predetermined tolerance value (t) (5.2° in the example). If the value measured is less than this value N1−t (24.8°), the programme introduces, in 504, the angular value of neutral position N1 into the working memory of the microprocessor, then skips to operation 505 (FIG. 5B) in order to rotate shaft 10 to neutral position N1, in which the counter-cams can be unblocked without any difficulty. It is to be noted that this unblocking may easily be achieved for all the nominal neutral positions of shaft 10.

If the test in 503 shows that value N is higher than the preceding value N1−t, the programme passes to the next test in 506 to determine whether value N is less than the nominal value of neutral N1, increased by tolerance value t (35.2° in the example). If so, the programme passes to step 507 in order to return to the main programme. In these circumstances, it is certain that the unblocking (or in other words the withdrawal of the counter-cams) can easily take place.

If the actual value is, on the contrary, higher than the value N1+t, the programme carries out a new test in 508 to examine the value N2−t, N2 being the position situated between the positions corresponding to gear ratios 2 and 3. If the test in 508 establishes that the nominal value is the smaller of the two values compared, the position of shaft 10 must be corrected. However, the system must also establish in which direction this correction has to be made, or in other words in which direction shaft 10 must be rotated. This is why the programme carries out a test in 509 to compare value N to the value V2−t, V2 being the nominal position for gear ratio 2. If N is less than this value, this means that shaft 10 must be rotated in the direction of position N1. In the opposite case, it must be rotated towards position N2. The programme thus proceeds to an operation for acquiring value N1 or value V2, as the case may be, in 510 and 511 respectively, after which the programme skips to step 505 in order actually to carry out the correct positioning of shaft 10.

It is possible, however, that when the vehicle is travelling in a certain gear ratio, it must be stopped abruptly and its engine stalls. The gearbox will then remain in the gear ratio in which was last engaged and it is possible that, in these circumstances, a blockage of the counter-cams also occurs. This is why sub-programme CARUN also enables unblocking to be achieved for higher gear ratios. The process which has just been described as regards neutral N1 may thus take place for all the neutral positions, if the number N is higher than N2−t. FIGS. 5A and 5B therefore show all the cycles which may thus be carried out, the corresponding operations controlled by the sub-programme having been designated by the same numerical references as those used in the first cycle with a letter index assigned to each.

It is clear that each of the cycles of sub-programme CARUN ends with operation 505 placing shaft 10 in one of the nominal neutral positions in which the counter-cams of shaft 11 may easily be withdrawn.

Figure 6A:
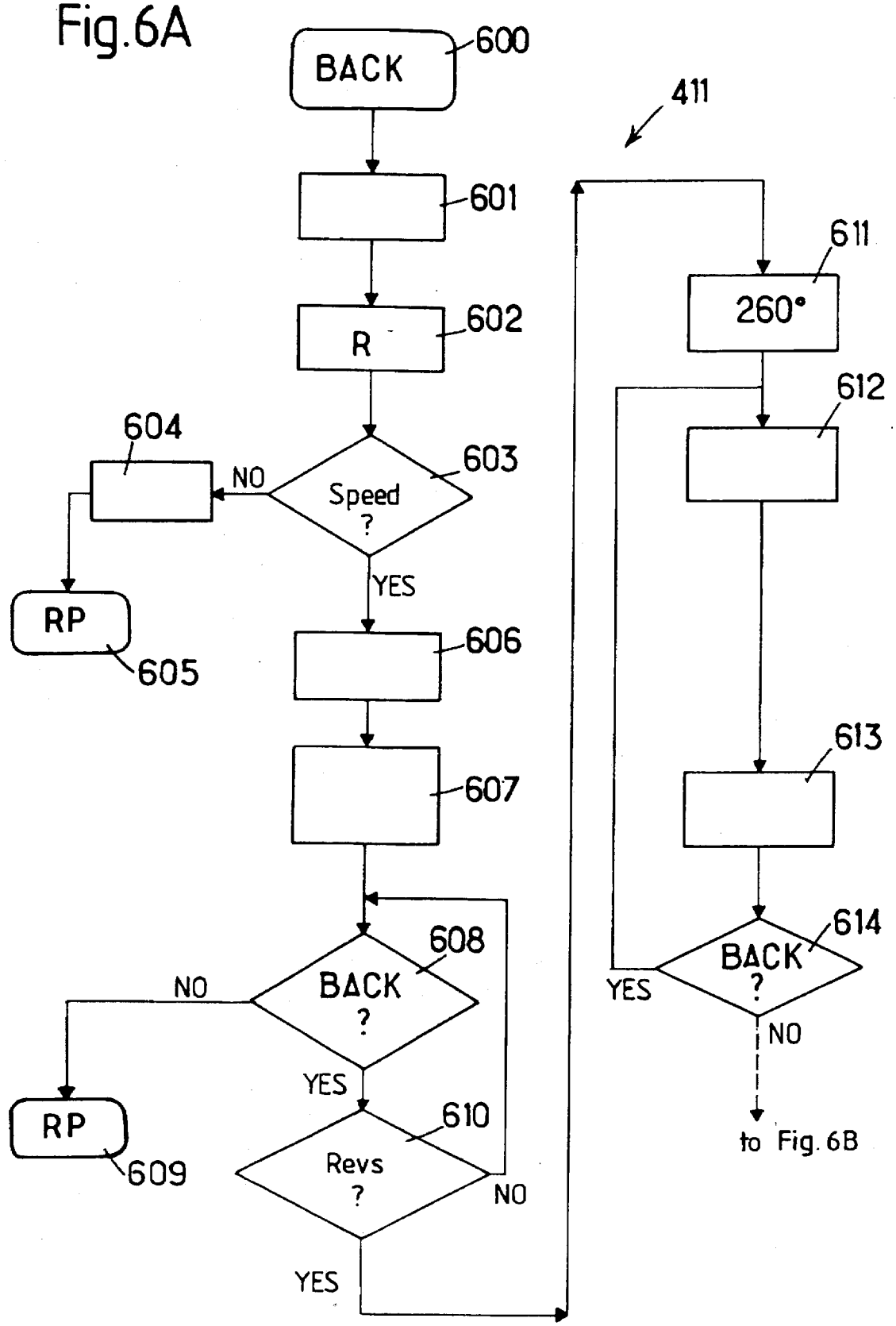
Figure 6B:
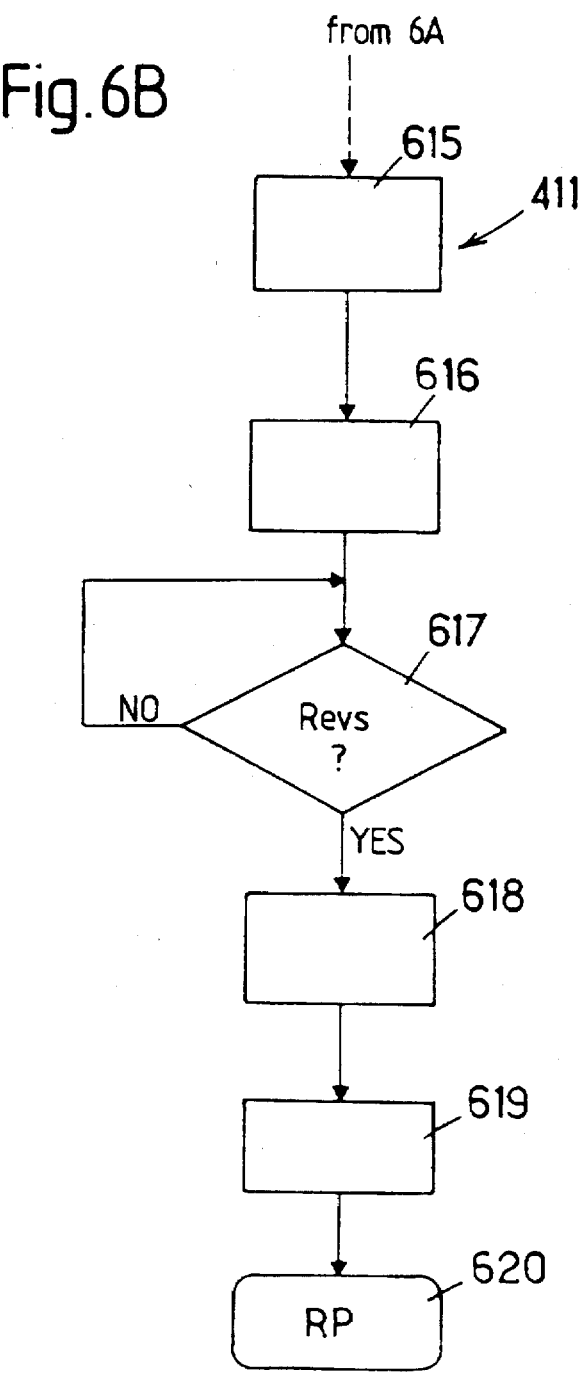

Operation 505 is followed by a stabilising operation in 512 enabling shaft 10 to accurately positioned, then, in 513, by a correcting operation of the position of shaft 11 to ensure that the latter is situated in the position (at 112° in the example described) corresponding to the withdrawal of the counter-cams. In 514, the display is kept in its "0" configuration and, in 515, sub-programme CARUN returns to the main programme. Reference will now be made to FIGS. 6A and 6B to describe sub-programme BACK (step 411 of FIG. 4). It will be recalled that this sub-programme is executed when, during test 410 (FIG. 4), the system has noted that reverse gear has been selected by the driver of the vehicle (position R of the control lever). It will also be recalled that, as described in the afore-cited patent application, reverse gear is mechanically engaged when shaft 11 is in a particular angular position (260° in the example described).

Consequently, when test 410 proves positive, sub-programme BACK is initiated in 600 (FIG. 6A). This operation is followed in 601 by an anti-rebound procedure on the contact of the lever, then in 602 by a display command "R" to display 66. In 603, a test is carried out to determine whether the speed of the vehicle is compatible with the engagement of reverse gear. If this speed is too high (that is to say higher than a very low value of 3 km per hour, for example), the programme passes to 604 where display 66 flashes, indicating to the driver that he is still driving too fast. The system then exits this sub-programme in 605 and returns to the main programme.

If the test in 603 proves positive, sub-programme 411 passes in 606 to a disengaging operation of clutch 7. The latter is followed by a step 607 which fixes a certain period of time to allow the clutch to disengage. In 608, a new check is carried out to verify whether reverse gear has indeed been selected. If this test proves negative, the programme passes into 609 to return to the main programme. If not, in 610, a test is carried out to check whether the vehicle engine revs are at a value (less than 2000 rpm for example) compatible with, the shift into reverse gear. If the test proves negative, the programme returns to operation 608 for a new test. As soon as the engine revs are compatible, sub-programme 411 passes to an operation 611 during which the angular value of 260° at which shaft 11 is in reverse gear position, is entered in the working memory of the microprocessor, then in 612, shaft 11 is rotated to the reverse position, an operation which is followed by the engaging of the clutch in 613. The driver of the vehicle may then reverse.

Sub-programme 411 then enters a waiting loop which ends when, in 614, a test determines that the control lever has left the reverse gear position, in other words, that the driver wishes to engage a forward gear. If the test in 614 responds that the position of the lever has not changed, the programme loops back on itself. In the opposite case, the clutch is commanded to disengage in 615 followed by a waiting operation in 616 to give it time to disengage.

The programme continues in 617 to check the vehicle engine revs which must be lowered to idling speed in order for shaft 11 to be able to be brought back to the position (at 112° for example) in which the counter-cams are out of the corresponding grooves of shaft 10. The test is carried out as many times as necessary until the right level of revs is reached. As soon as the test in 617 proves positive, the angular value (of 112°) is entered in the working memory of the microprocessor (operation 618). Then, in 619, drive motor 52 of shaft 11 is actuated in order to place the latter in the required position (of 112°). The system then exits sub-programme 411 in order to loop back to the main programme in 620.

Figure 7A:
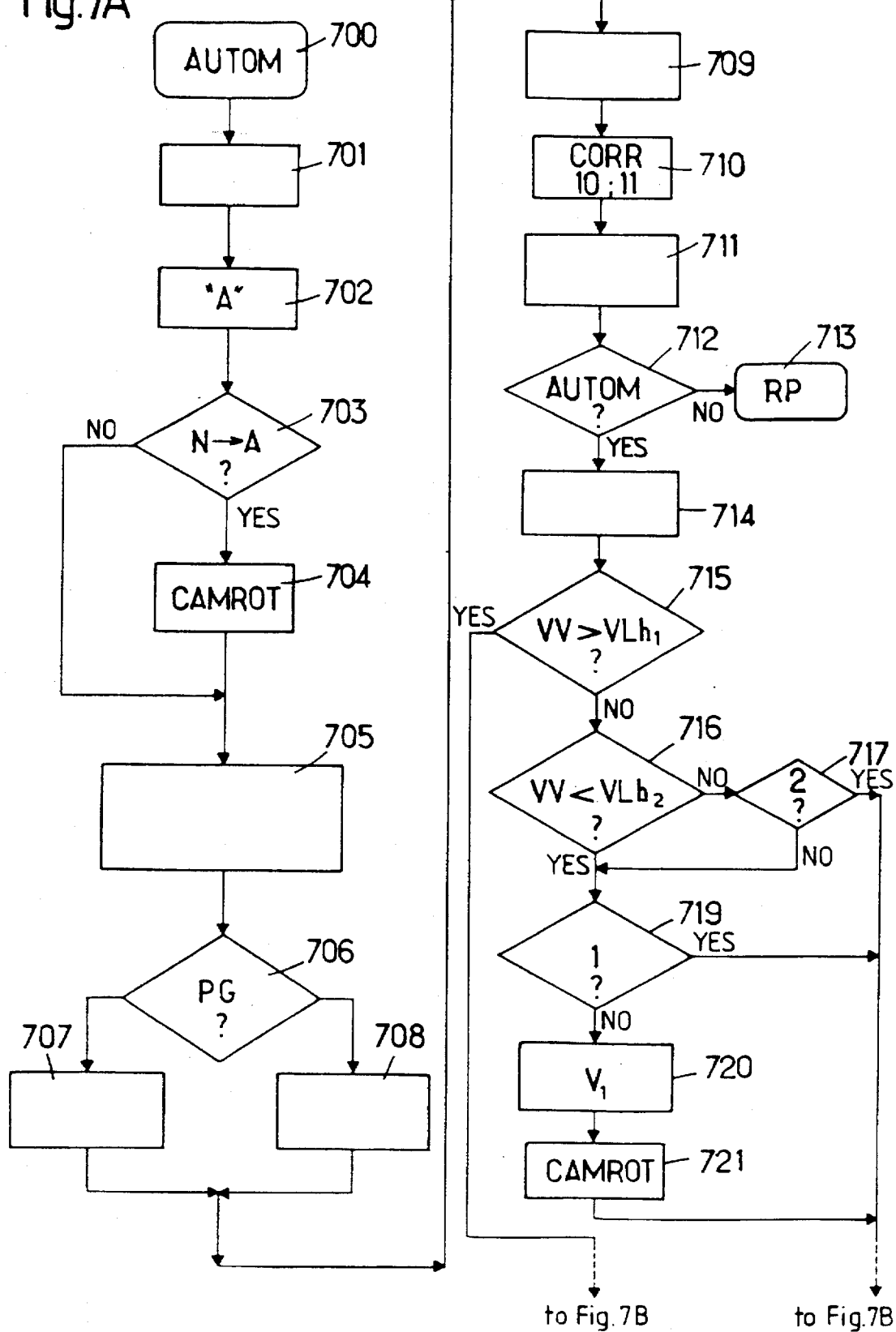
Figure 7C:
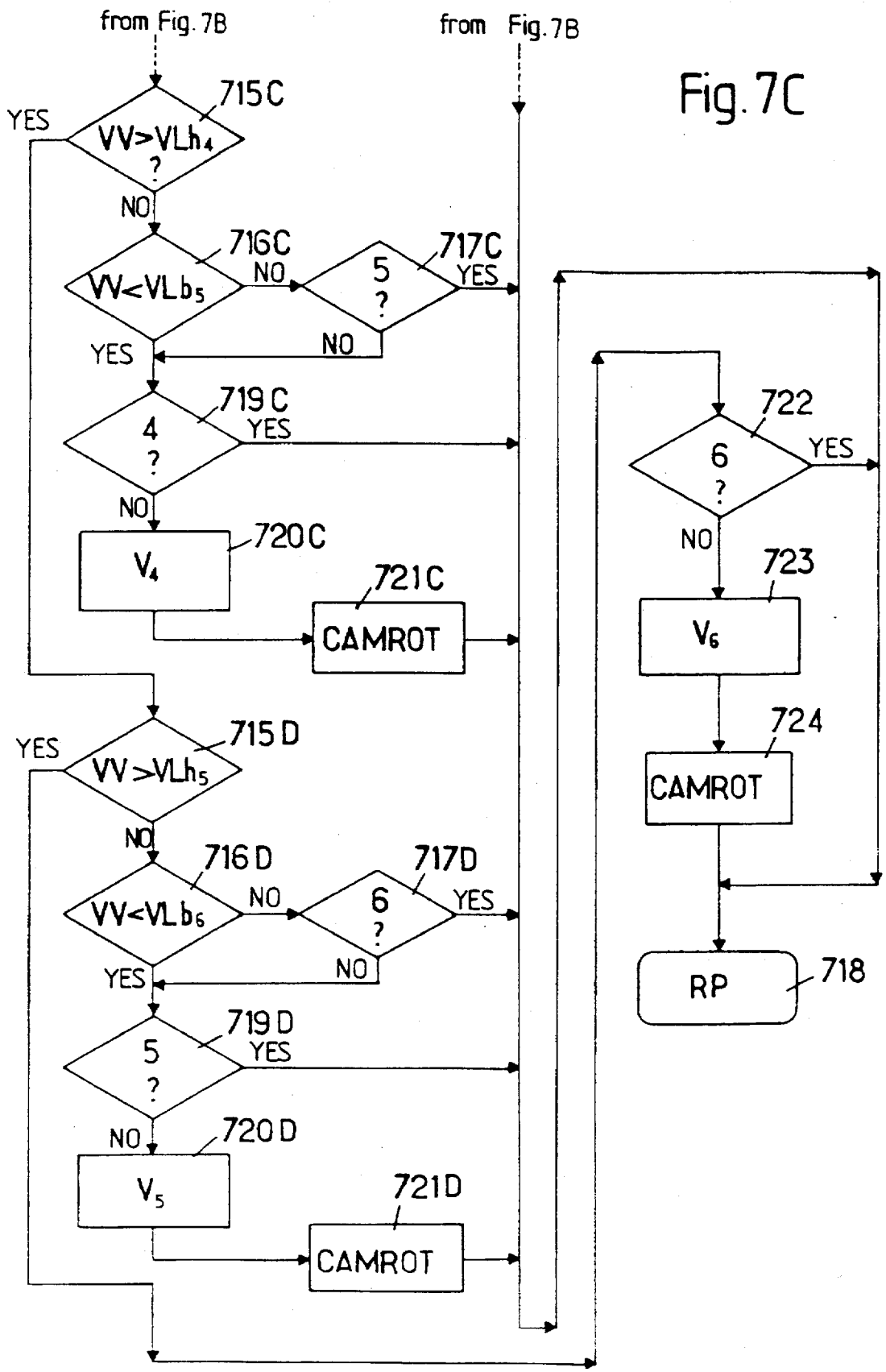
Figure 8A:
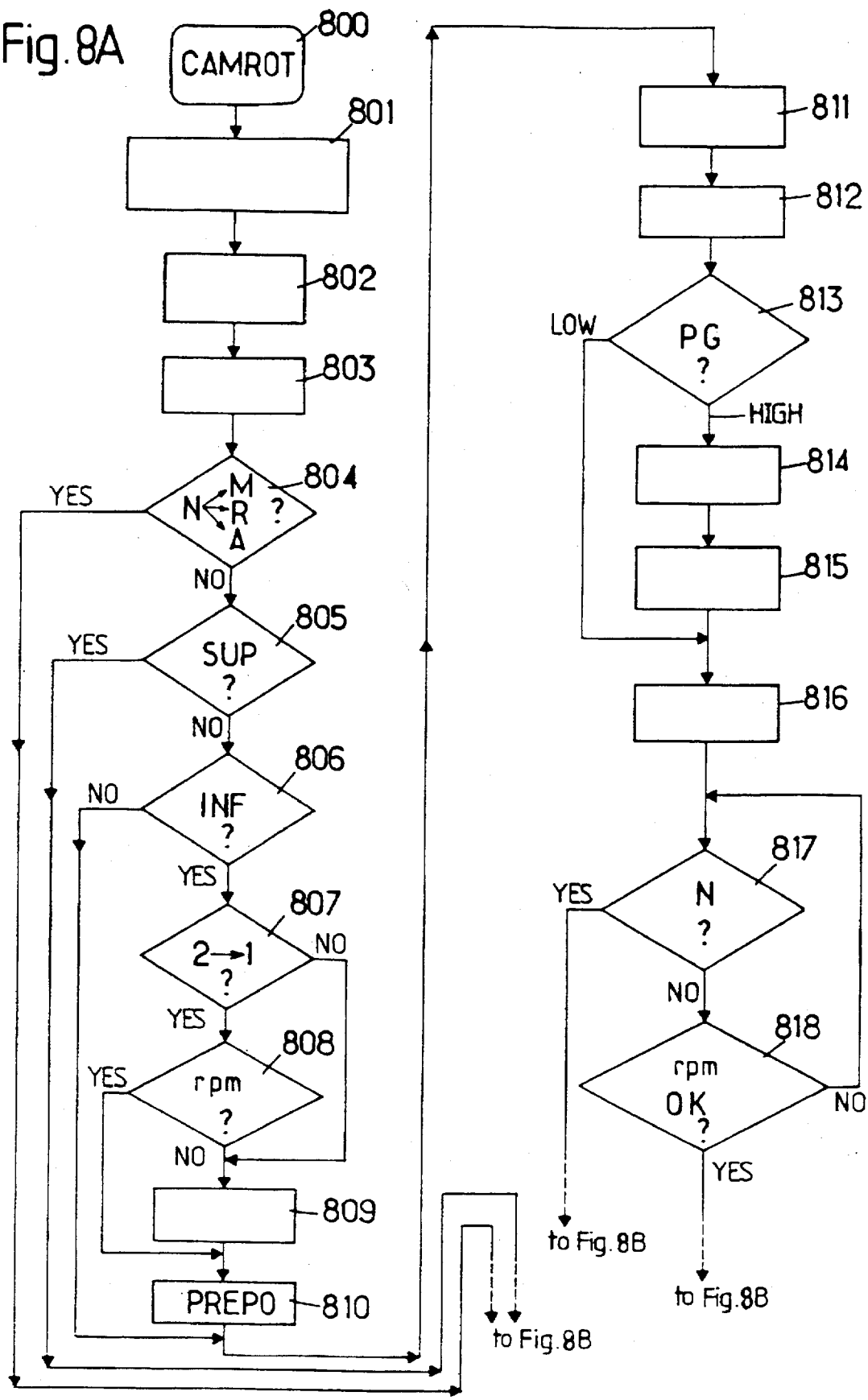
Figure 8D:
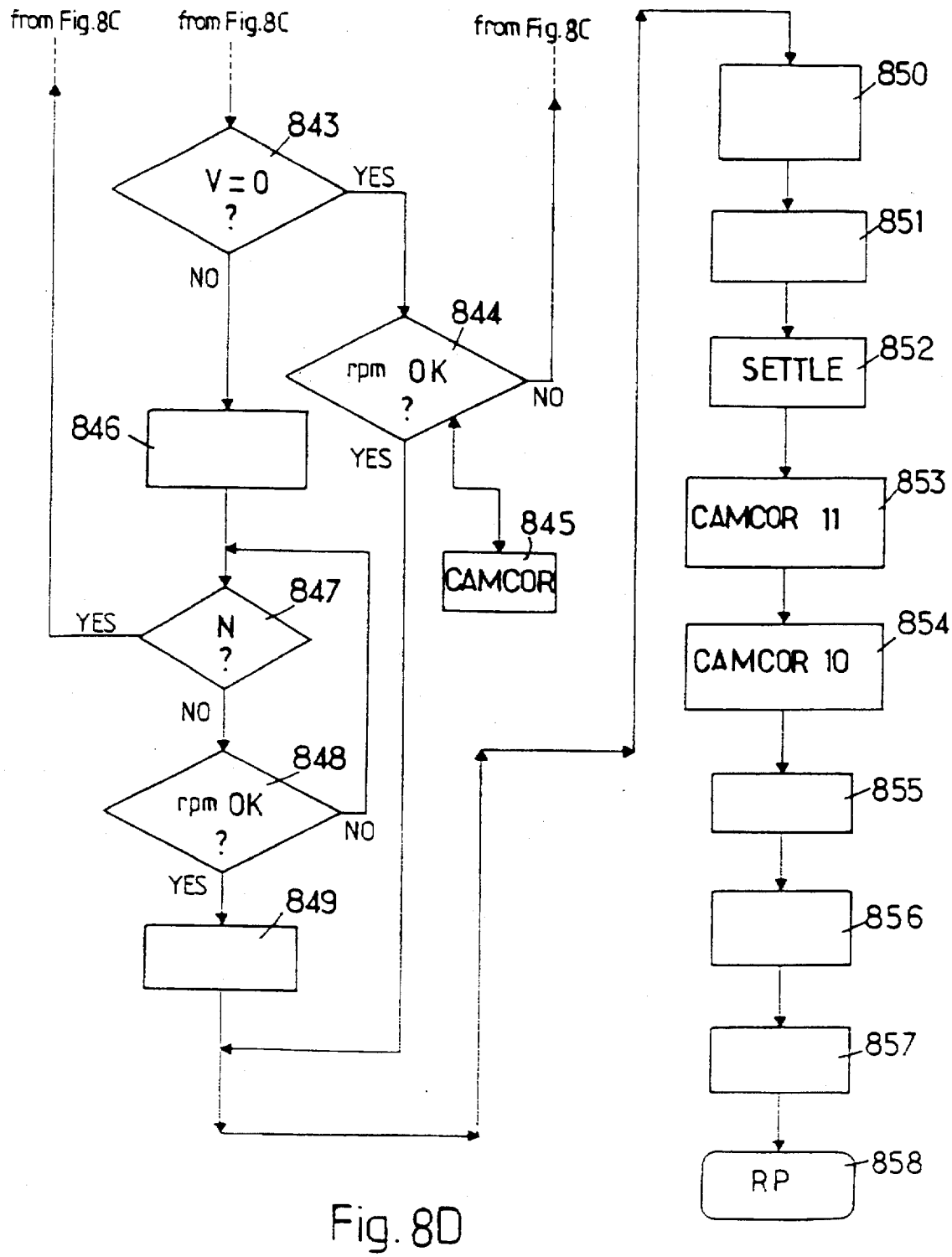

Reference will now be made to FIGS. 7A, 7B and 7C in order to describe the development of sub-programme AUTOM which is step 413 of the main programme. It will be recalled that the system enters this sub-programme in response to a test carried out at position A of the gearbox control lever accessible to the driver of the vehicle.

Programme AUTOM is initiated in 700 at the end of test 412. In 701 an anti-rebound check is carried out, then in 702, the display is ordered to display the letter "A" to indicate to the driver of the vehicle that automatic control has been selected.

In 703, a test is carried out to check whether or not the preceding configuration was one of the neutral positions. It is possible that in manual mode, the gearbox was in one of its neutral positions and that nonetheless the vehicle was travelling at a certain speed. The automatic control must then place the gearbox in the gear ratio which corresponds to this vehicle speed. If the test proves positive, sub-programme AUTOM passes into sub-programme CAMROT (operation 704) which enables the gearbox to be placed in the required gear ratio. This latter sub-programme will be examined below with reference to FIGS. 8A to 8D.

The gearbox thus being in the gear ratio which corresponds to the speed of the vehicle, in 705, the position parameters of slaving motors 51 and 52 and thus of shafts 10 and 11 are obtained. During this operation, a stricter positioning tolerance is allocated to these parameters, this tolerance being compatible with an appropriate control of the gearbox mechanism.

Once the position parameters of motors 51 and 52 have thus been obtained, they are compared to data relating to the present position of accelerator pedal PG of the vehicle. Apart from controlling the flow of the combustible mixture introduced into the engine of the vehicle, pedal PG is also designed to provide position data representative as to whether the driver wishes to slow the vehicle down, or, on the contrary, to increase its speed.

Thus, the travel of the accelerator pedal is divided into two parts and a switch is associated with the pedal. This switch changes state when the pedal passes from one part of the travel to the other and vice versa, and the microprocessor interprets this as meaning "raised pedal" or "depressed pedal".

The position of pedal PG is tested in 706 and according to the result of this test, one or the other of two tables of values, respectively a "slowing down" table 707 and an "acceleration" table 708, are loaded into the working memory of the microprocessor.

It is to be noted that in an alternative embodiment, the accelerator pedal may be equipped with a position sensor (a potentiometer, for example) providing a continuous range of position values which can be appropriately processed by the microprocessor.

The sub-programme then passes, in 709, to a clutch position check and, if necessary, places the clutch in the engaged configuration. Then, in 710, the positions of shafts 10 and 11 are checked and, if necessary, these positions are adjusted to their nominal values in accordance with the correction sub-programmes already described in relation to steps 505 and 513 of sub-programme CARUN.

The next operation 711 consists of checking the operating parameters of the alternator which is coupled to the engine of the vehicle to provide the required electric energy, as is well known in the art. It is to be noted here that in the case of the invention, the operation of this alternator is not entirely conventional since, in certain operating conditions of the assembly of the vehicle engine and the gearbox which is used with it, the alternator must be disconnected from the electric network which it supplies. This particular operation will be described below.

In 712 a test is carried out to check again the position of the control lever. If it has remained in automatic control position A, sub-programme AUTOM continues to proceed. If not, the system exits this sub-programme in 713 and returns to the main programme.

In 714, the system obtains a value representing the instant speed of the vehicle, then the sub-programme enters another automatic gear ratio selection step.

Before describing the development of this automatic selection, it should be noted that tables 707 and 708 contain, for each gear ratio, two limit values, respectively high (VLh) and low (VLB) situated on either side of the nominal vehicle speed value VN which would be ideal for operating the gear ratio shift. It is also to be noted that the range of-speeds fixed by said limits overlap from one gear ratio to another. Thus, for example, value VLh1 which is thus the upper limit value of the range concerning gear ratio 1 is higher than the lower value of the range of speeds corresponding to gear ratio 2. This organisation of values is valid for both tables although the values of a determined gear ratio may differ in the two tables, the gear shifts not being carried out for the same vehicle speeds, according to whether the latter is accelerating or slowing down. The reason for the overlapping of the ranges of speeds in each table is that it is necessary to avoid a "hesitation" in the gear ratio shift control which would render the functioning of the gearbox unstable. The programme steps which will now be described are thus identical, whichever table of values has been selected as a function of the position of the accelerator pedal. Only the speed values change according to these two cases.

This being so, reference will again be made to figure 7A, where it can be seen that in 715 a test is carried out to determine whether vehicle speed VV is higher than value VLh1 of either table 707 or 708, it being recalled that the table is selected as a function of the position of the accelerator pedal at the moment in question.

If the response to test 715 is "no", the programme passes to the next test in 706 to determine whether speed VV is less than value VLb2. If the response is "no", the programme passes to another test in 717 to check whether the gearbox is already in gear ratio 2. In the event of a positive response, the sub-programme loops back in 718 (FIG. 7C) to the main programme and the vehicle continues to travel with gear ratio 2 engaged until another event occurs.

In the event of a positive response to test 716 or a negative response to test 717, the programme passes to test 719 to check whether gear ratio 1 is engaged. If this is so, the sub-programme loops back in 718 to the main programme and the vehicle continues to travel with gear ratio 1 engaged. If not, the sub-programme passes to operation 720 which consists of storing in the working memory of the microprocessor the angular position value of shaft 10 corresponding to gear ratio 1. Then, the system engages, in 721, in another sub-programme CAMROT which causes the gearbox to shift into gear ratio 1, from whichever other gear ratio the gearbox was engaged in. If the response to test 715 proves affirmative, sub-programme AUTOM passes directly to another test 715A to begin a similar procedure to that which has just been described, but this time as regards gear ratio 2, and so on until gear ratio 6.

The different operations of these gear ratio shift procedures or cycles are not therefore described in detail; in the figures, they have been designated each time by numerical references followed by a letter index.

At the end of the procedure concerning gear ratio 5, the sixth gear ratio may be engaged but, of course, without checking whether a higher gear ratio is engaged. The corresponding operations have been designated respectively by the references 722, 723 and 724.

Sub-programme CAMROT will now be described with reference to FIGS. 8A to 8D. The sub-programme is initiated in 800. In 801, electronic control device DCE stores in its memory a table which defines, for each gear ratio of gearbox 1, a predetermined value for the revs of engine 3. Each of these values corresponds to an appropriate level of revs so that the shift into said gear ratio can take place with the best possible synchronization.

Then, in 802, torque converter 6 is put out of action. In 803, clutch 7 is ordered to disengage.

In 804, a test is carried out to determine whether the driver has changed the position of the control lever to M, R or A. If this is not the case, the programme passes to a test in 805 to check whether the gearbox has to shift into a higher gear ratio, compared to the gear ratio in which it is engaged at the moment in question.

If the response to test 805 is negative, another test is carried out in 806 to check whether the gearbox has to shift into a lower gear ratio. If the response to test 806 is positive, the system carries out another test in 807 to check whether the gearbox has to be shifted down from gear ratio 2 to gear ratio 1. If the response to this test is affirmative, a test is carried out in 808 to check whether the vehicle engine revs are compatible with this gear ratio shift.

If the response to test 808 is negative, a command is produced in 809, on the one hand to actuate the opening of mobile flap 86 (FIG. 3) and, on the other hand, to disconnect the alternator from the electric network of the vehicle, the effect of this command being the very rapid increase of the engine to the maximum revs. If the response to test 807 is negative, test 808 is skipped and the system passes immediately to command 809. If the response to test 808 is affirmative, the system enters a sub-programme PREPO in 810, as it also does after executing command 809 in the event of a negative response to test 808. Sub-programme PREPO will be described in detail below; it is sufficient to note here that it is intended to rotate shaft 10 to the neutral angular position which is situated as close as possible to the angular position of shaft 10 corresponding to the gear ratio to be engaged.

In the event that test 806 has a negative response (that is to say no gear ratio shift is necessary), tests 807 and 808, as well as command 809 and sub-programme PREPO are skipped.

In the latter case and also at the end of sub-programme PREPO, the programme operates a waiting period in 811, after which the clutch is engaged in 812 (it had been disengaged since operation 803).

Once operation 812 is finished, a test is carried out in 813 to check the position in which accelerator pedal PG is situated. If this test receives the response "high" (that is to say the pedal is depressed to obtain a high level of revs of engine 3), the programme passes to operation 814 which consists of disconnecting the fuel supply to the engine of the vehicle in order to avoid it racing. Operation 814 is followed by operation 815 which imposes a required waiting period, if necessary, for reducing the engine revs. Then in 816, the fuel supply is restored again so that the engine can continue to rotate at lower revs.

If the response to test 813 is "low" (raised pedal), operations 814 and 815 are skipped and operation 816 is immediately executed.

Operation 816 is followed by a test in 817 to check once more whether the control lever is in the neutral position. If this is not the case, a test is carried out in 818 to check whether the engine revs have increased or decreased properly from the value of the revs corresponding to the gear ratio engaged until then, so that the gear ratio shift can take place. This test 818 is repeated by looping back until the revs have reached the correct value.

In 819, a test is again carried out to check whether the lever is in the neutral position. Then in 820, as a safety precaution, the programme checks the engine revs to check that they do not exceed the maximum imposed safety value (7000 rpm for example). If so, the programme then loops back, in 821, to an operation closing mobile flap 86 and re-establishing the fuel supply so that the engine revs can decrease to a permitted value. At the end of this part of the programme, the engine has thus reached the appropriate level of revs enabling the new gear ratio to be engaged, primary shafts 8 and 9 then rotating at speeds such that the peripheral speed of the pinions is equal. This gear ratio is displayed on display 66 during operation 822.

Operation 823 consists of disengaging the clutch again, then, after a waiting period established in 824, sub-programme CAMCOR is executed in 825 to place shaft 10 in the correct angular position. Next, the clutch is engaged in 826 after another waiting period in 827, and sub-programme CAMROT passes into its final phase which will be described below.

Before describing this final phase, it is appropriate to examine the operations which take place when a higher gear ratio has to be engaged. These operations are carried out when the test in 805 provides an affirmative response and they begin with a waiting period in 828 followed in 829 by the execution of sub-programme PREPO which selects the neutral position of shaft 10 situated closest to the gear ratio to be engaged. This step is followed in 830 by a position checking operation of pedal PG in accordance with a sub-programme VERIF PG which will not be described in detail. The object of this sub-programme is to force the pedal position value to the lower value in order to prevent the engine racing.

Sub-programme CAMROT then engages in 831 in a test for checking the position of the control lever, then in 832 in an engine rev checking loop in which the programme remains until the revs reach the desired value corresponding to the gear ratio to be engaged. As soon as this level of revs is reached, the sub-programme passes into its final phase.

The latter begins in 833 with sub-programme CAMCOR which places shaft 10 in the exact desired angular position if it was not previously in such position.

The execution of sub-programme CAMCOR is followed in 834 by an operation closing mobile flap 86 and in 835 by engaging the clutch if this has not already been done. In 837, assurance is obtained that the fuel supply has been re-established and the system exits sub-programme CAMROT in 838.

If tests 817, 819 and 831 receive an affirmative response, sub-programme CAMROT is interrupted by passing immediately to operation 839 which consists of closing mobile flap 86, followed by a fuel supply re-establishing operation in 840 after which, the system exits the sub-programme in question in 841.

When the response to test 804 is affirmative, sub-programme CAMROT enters a gearbox control mode modifying phase.

The object of this phase is essentially to guarantee that, if the driver suddenly or involuntarily modifies the position of the control lever before the part of sub-programme CAMROT which has just been described is enacted, the gearbox places itself back in the appropriate gear ratio taking account of the travelling conditions of the vehicle at the moment when the control lever position is changed.

This final phase of sub-programme CAMROT begins with a test in 842 to check whether the lever remains in neutral position N. If the response is affirmative, the programme loops back to operation 839 and the execution of sub-programme CAMROT concludes with operations 840 and 841. If, on the other hand, the response is negative, a test is carried out in 843 to check whether the speed of the vehicle is equal to zero (stationary vehicle). If the vehicle is stationary, a test is carried out in 844 to check the engine revs. The test loops back to test 842, until the revs correspond to a level of revs compatible with a shift into gear ratio 1 (around 1000 rpm). During the waiting time, sub-programme CAMCOR can be executed in 845 if it is necessary to adjust the angular positions of shafts 10 and 11 to their desired positions of the moment.

If the test in 843 determines that the vehicle is moving, it is appropriate to shift into the gear ratio corresponding to this speed. Consequently, in 846, mobile flap 86 is open and the alternator is disconnected in order to raise the engine revs. In 847, another check is made to determine whether it has been placed in neutral position N. If the response is positive, the sub-programme loops back to operation 839. If not, a test is carried out in 848 to check whether the engine revs correspond to a level of revs compatible with the gear ratio to be engaged. This test is repeated by looping back until the revs have decreased to the prescribed value.

Then, in 849, mobile flap 86 is closed. In 850, a waiting period is provided after which, in 851, the positioning parameters of shafts 10 and 11 are stored in the working memory of the microprocessor. The new gear ratio is displayed as a result of sub-programme SETTLE in 852, then the system proceeds to the positioning of shafts 11 and 10 (in that order) in 853 and 854, respectively. After the re-establishment of the fuel supply in 855, the elapse of a time period established in 856 and the engaging of the clutch which is effected in 857, sub-programme CAMROT loops back to the main programme in 858. Finally, at the end of test 844, the system also carries out operations 850 to 858 to place the gearbox in gear ratio 1, so that the vehicle is ready to move off again.

Figure 9B:
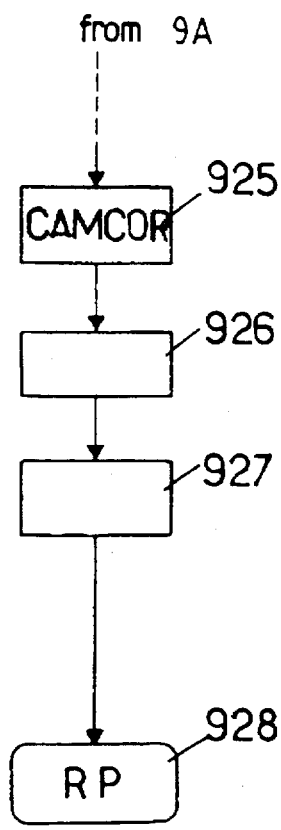
Figure 9A:
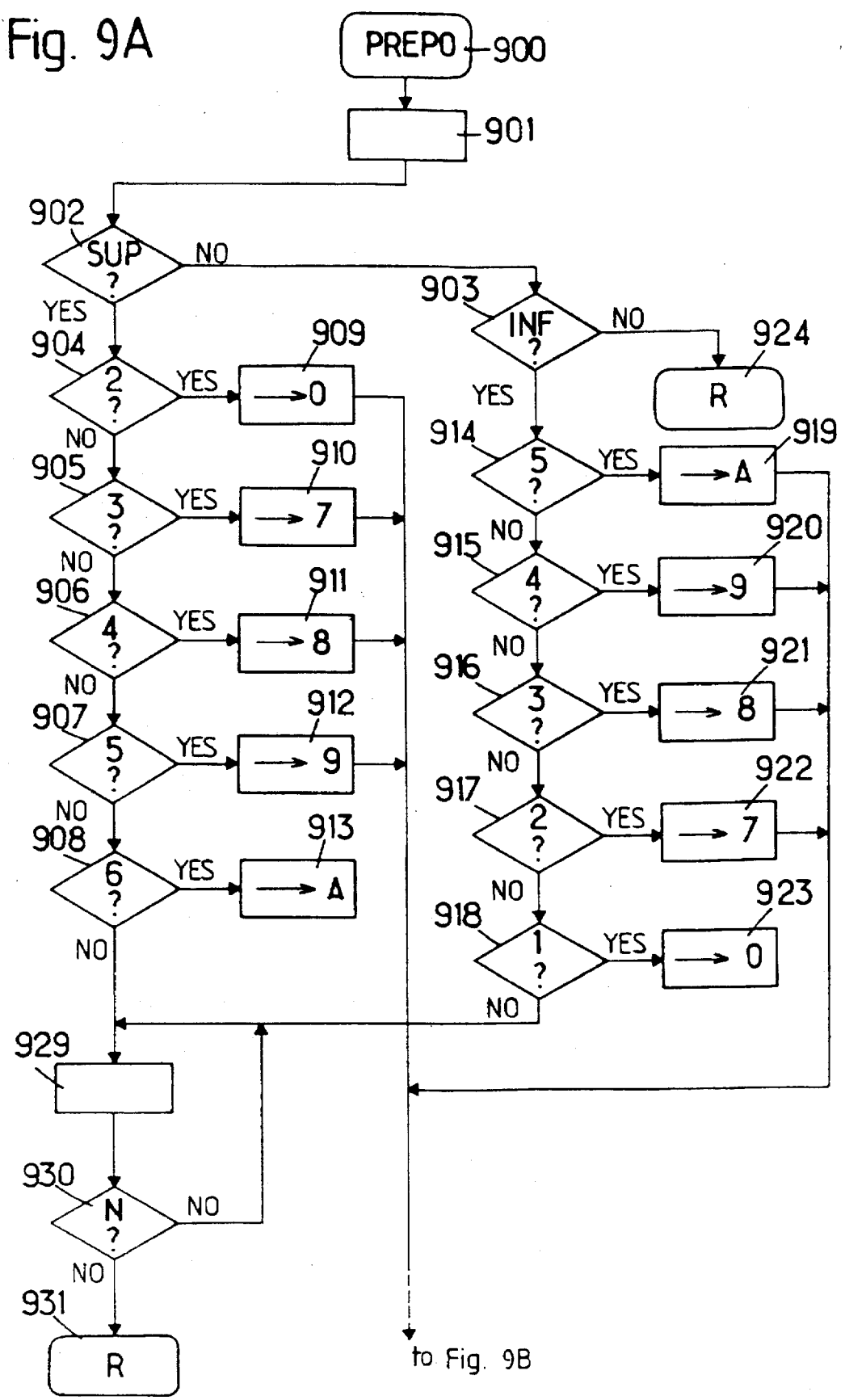
Figure 10A:
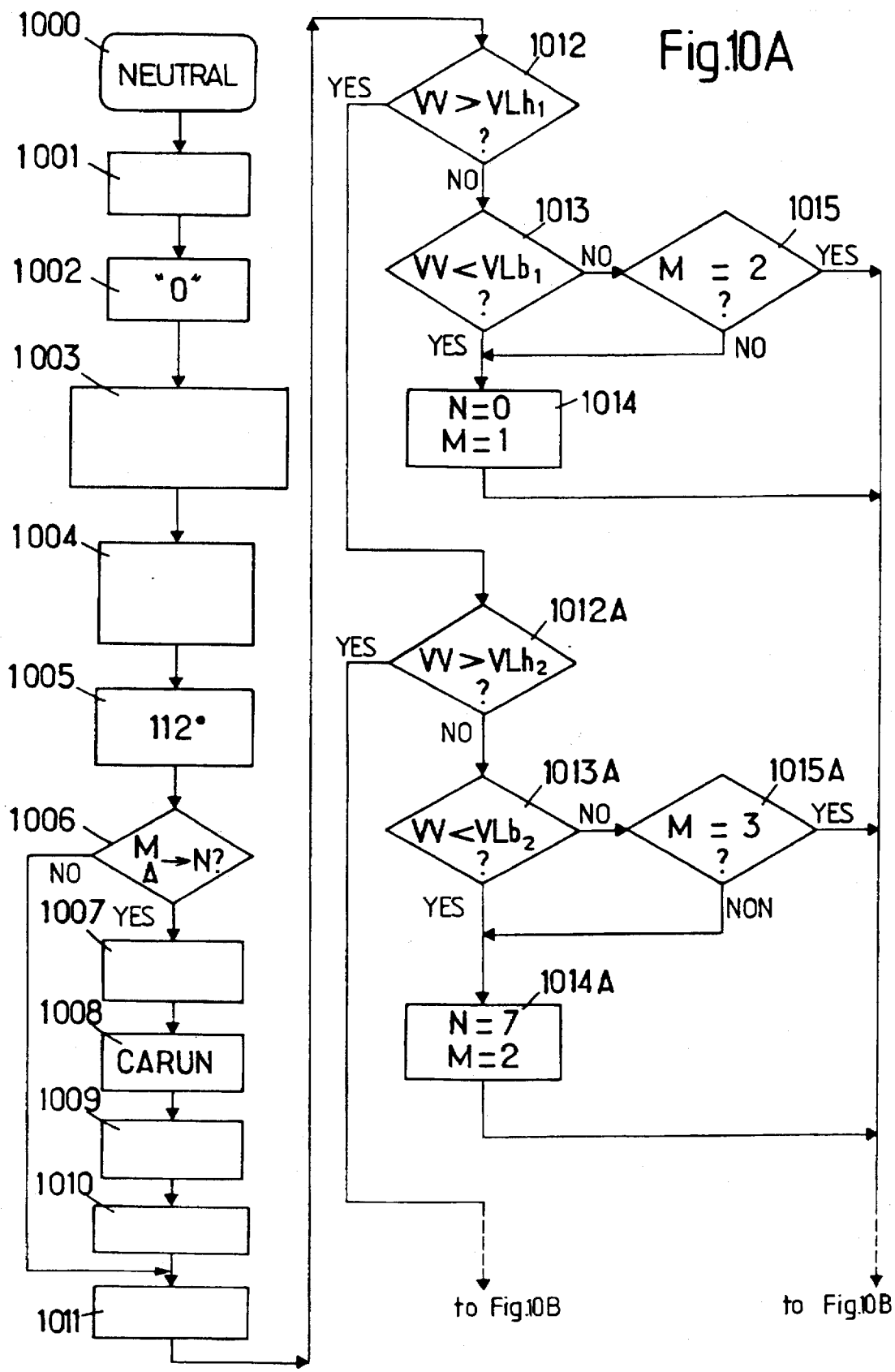
Figure 10C:
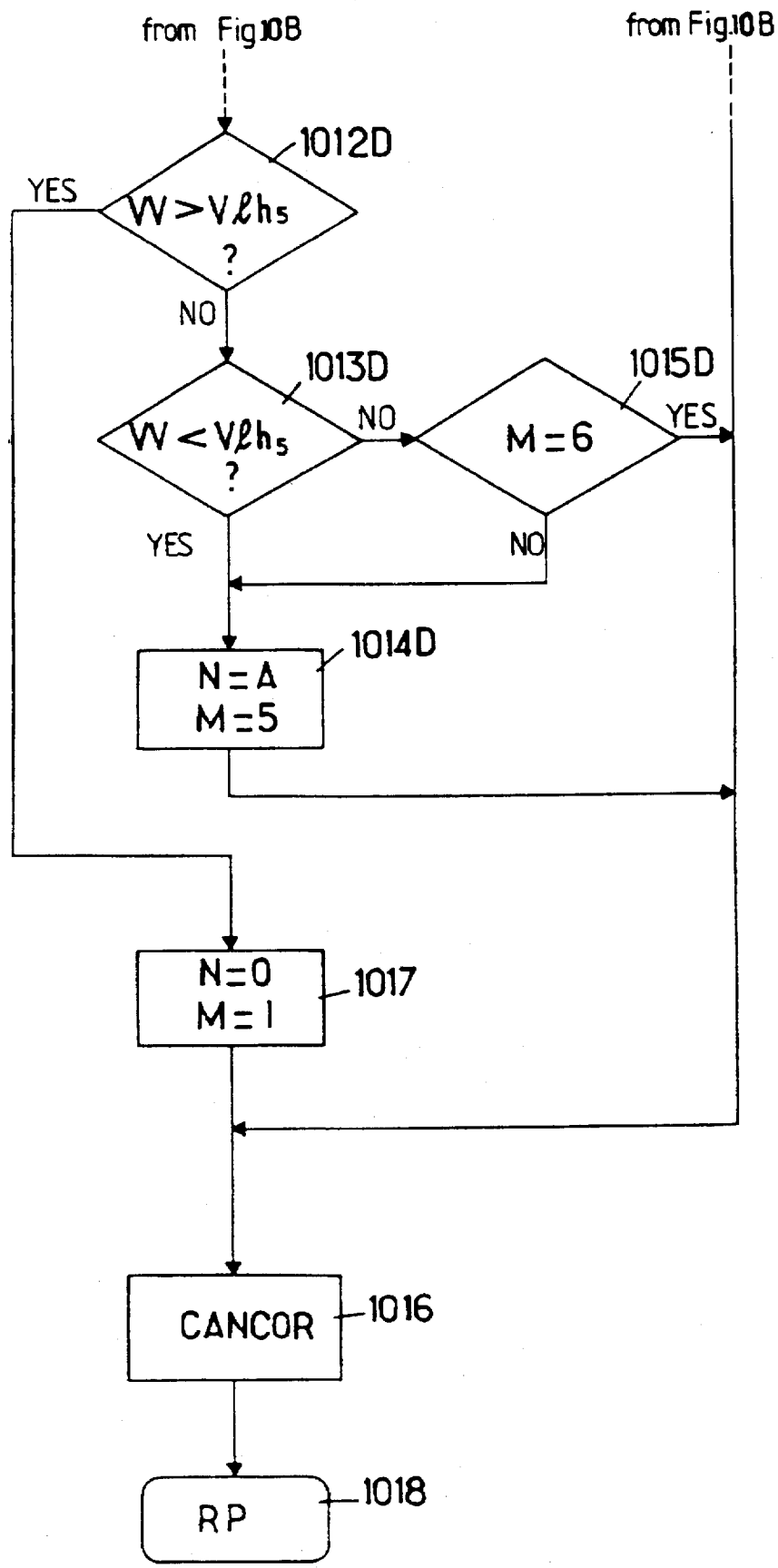

Sub-programme PREPO will now be described with reference to FIGS. 9A and 9B. This sub-programme is executed in several phases of the gearbox control procedure in order to place shaft 10 in the most favourable neutral position for bringing it into the position of the selected gear ratio. If the gearbox has to go to a higher gear ratio, the most favourable neutral position is that situated immediately above, in the direction of the numbering of the positions of shaft 10. Of course, for a lower gear ratio, the most favourable position is below.

The manner in which the different positions of shaft 10 are designated was specified during the description given above in relation to sub-programme CARUN. These designations are used in the same way to describe sub-programme PREPO. The latter is initiated in 900 (FIG. 9A). In 901, the desired angular value, that is to say, the angular position of the gear ratio to which the gearbox has to switch, is stored in the working memory of the microprocessor. A test is carried out in 902 to determine whether the next gear ratio is a higher gear ratio. If not, the programme passes to a test in 903 to check whether the next gear ratio is a lower gear ratio.

If the test in 902 is affirmative, sub-programme PREPO passes through a series of tests (904 to 908) to compare the desired value stored in 901 with the angular values of the different gear ratio positions of shaft 10. The first of the tests giving an affirmative response causes the sub-programme to pass to the control operation of motor 51 so that shaft 10 is turned to the neutral position which, in the up-shifting direction of the gears, is situated immediately before the position required for the engagement of the desired gear ratio. These operations are designated respectively by the references 909 to 913.

If, moreover, the response to test 903 is affirmative, the same tests and the same control operations are carried out, but of course in the down-shifting direction. The corresponding tests are designated by the references 914 to 918 and the corresponding control operations by 919 to 923.

If the response to test 903 is negative, the programme loops back in 924 to the sub-programme of which it itself constitutes a sub-programme. At the end of each of operations 909 to 913 and 919 to 923, the programme passes into sub-programme CAMCOR in 925 (FIG. 9B) to place shaft 10 in the neutral position of shaft 10 selected by programme PREPO. Of course, during this time, shaft 11 is in the 112° position in which it lifts the counter-cams out of the grooves of shaft 10.

The execution of sub-programme CAMCOR is followed by a stabilising operation 926 of the selected position of shaft 10, then in 927 by confirmation of the position value obtained in 901 after which sub-programme PREPO loops back in 928 to the sub-programme from which it was initiated.

If either one of tests 908 and 918 proves negative, an error message is displayed in 929, then the system waits for the response to a test in 930 checking whether a neutral position has been reached. If not, the sub-programme loops back to the error message. If the response is affirmative, sub-programme PREPO loops back in 931 to the sub-programme from which it was initiated.

Sub-programme NEUTRAL to which the main programme loops when the test in 412 (FIG. 4) proves negative and the test in 414 proves positive will now be examined. Sub-programme NEUTRAL appears in FIGS. 10A, 10B and 10C; it is initialised in 1000 when the control lever is placed in position N (FIG. 2A). First of all, an anti-rebound procedure is carried out at the corresponding contact in 1001, then display 66 is commanded in 1002 to display the figure "0".

In 1003, the positioning parameters (with strict tolerances) of shaft 10 are introduced into the working memory of the microprocessor, then in 1004 several commands are effected such as the disconnection of the alternator, the closure of mobile flap 86 and the opening of the fuel supply. In 1005, the value of 112° of shaft 11 is introduced into the memory of the microprocessor.

In 1006, a test is carried out to check whether the control lever has just been moved from position M or A to position N. If so, a gear ratio can be engaged so that sub-programme NEUTRAL must first control, in 1007 the disengagement of clutch 7. The programme then passes in 1008 to sub-programme CARUN already described above, which in particular places shaft 11 in the 112° position for releasing counter-cams 42, 43 and 44.

A time period is fixed in 1009 then the clutch is again engaged in 1010. Next, in 1011, the speed of the vehicle is introduced into the working memory of the microprocessor. If the test in 1006 gives a negative response, the programme skips steps 1007 to 1010.

Next, sub-programme NEUTRAL engages in searches for the neutral corresponding to the instant speed of the vehicle. In order to do this, the value obtained in 1011 is compared to one of the speed tables described above in relation to sub-programme AUTOM as regards operations 707 and 708 (FIG. 7A). The table used here is the one corresponding to the "slowing down" table associated with the raised position of the accelerator pedal. During the execution of sub-programme NEUTRAL, it is not necessary to use the other table, which simplifies the operations to be executed.

Consequently, in 1012 a test is carried out to check whether speed VV of the vehicle is higher than speed Vlh1 which is the high speed of the range of speeds permitted for the first gear ratio of the "slowing down" table. If the response to this test is negative, the programme passes in 1013 to a test which checks whether speed VV is less than the low value of this range. If the response to this test is affirmative, operation 1014 stores two values which will be available for subsequent operations, namely the angular value 0 of shaft 10 and the angular value 1 of the latter, in the event that the manual mode is selected immediately afterwards by the driver.

If the response to test 1012 is affirmative, the programme passes to the second cycle of the programme relating to neutral 1 and gear ratio 2. At the end of operation 1014 and in the event that test 1015 proves positive, the programme passes to operation 1016 which is the execution of programme CAMCOR for positioning shaft 10 at its selected angular position.

The subsequent cycles of the programme proceed in a similar manner and the equivalent operations of the programme have been designated by the same numerical references followed by a letter index. Of course, the cycle relating to gear ratio 6 is the exception since, when operation 1012D receives a positive response, the neutral value 0 and the value M=1 are entered, in 1017, in the memory of the microprocessor before the programme passes to the execution of sub-programme CAMCOR. In any case, at the end of the execution of this programme, sub-programme NEUTRAL loops back to the main programme in 1018.

Figure 11:
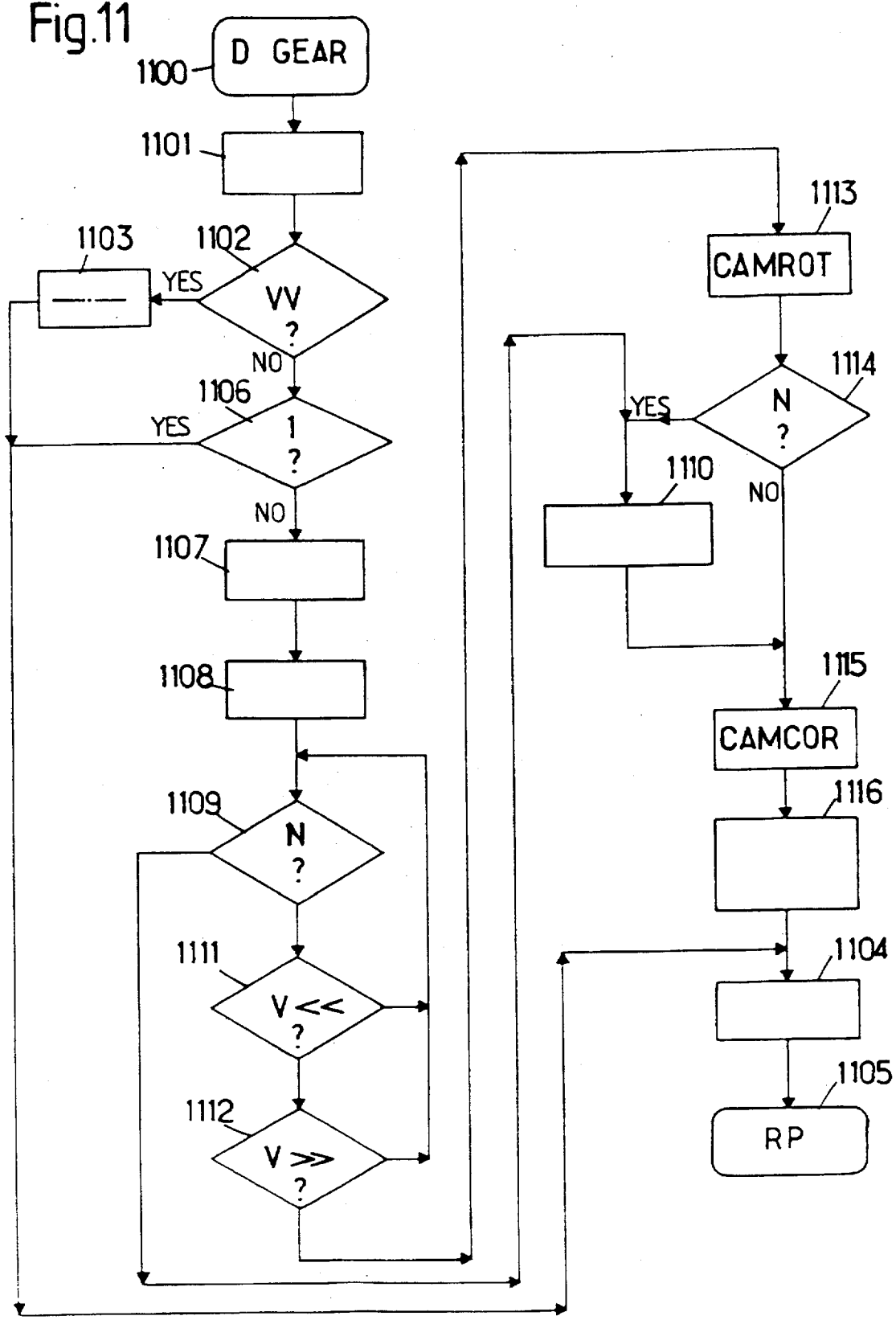

Reference will now be made to FIG. 11 which illustrates the development of sub-programme DGEAR. This sub-programme is initiated in 1100, when the response to test 418 of the main programme proves positive. In other words, in order to enter this sub-programme, the control lever must be moved from position M to position INF of FIG. 2A.

An anti-rebound operation is effected in 1101 after which a test is carried out in 1102 to check whether the speed of the vehicle is less than a very low speed (3 km/hr for example). If this speed is less than this value, the programme passes in 1103 to the flashing display of the sign—to show the driver that no gear ratio will be engaged. If the lever is released, the programme is skipped entirely until a flashing display stopping operation in 1104, after which the programme loops back to the main programme in 1105.

If the speed of the vehicle is higher than the low speed, the test in 1102 receives a negative response and the programme passes to a test in 1106 to check whether the gear ratio control value is equal to 1. If this is the case, the programme loops back to operation 1104 anyway, since evidently a gear ratio lower than the first cannot be engaged. If the test proves negative, the programme continues with an operation in 1197 causing the display to pass to the number lower than that which was previously displayed. In 1108, the display is made to flash to show that a gear ratio shift is in progress. In 1109, a test is carried out to check the position of the control lever. If the latter is placed in position N, the programme passes in 1110 to a display operation of the gear ratio engaged at that time. If not, a test will be carried out in 1111 to check whether the speed of the vehicle is lower than the range of speeds fixed by the speed tables described previously (relating to slowing down) for the gear ratio requested by the driver. If this is not the case, a new test is carried out in 1112 to check whether speed V is higher than this range. If the response to this test is negative, sub-programme DGEAR enters, in 1113, sub-programme CAMROT already described above, so that shafts 10 and 11 can be placed in their appropriate angular positions. If the responses to tests 1111 and 1112 are positive, the programme loops back to test 1109.

At the end of programme CAMROT, a test is carried out in 1114 to check once more the position of the control lever. If the lever has been placed in the neutral position, the display is corrected by operation 1110. At the end of this operation or in the event of a negative response to test 1114, the programme loops back to sub-programme CAMCOR in 1115 to position the two shafts 10 and 11 accurately. Then, in 1116, the programme checks whether the control lever has returned to position M in order then to pass to operation 1104 and to exit the main programme in 1105.

Sub-programme UGEAR to which the system passes after a positive response to test 420, is similar mutatis mutandis to sub-programme DGEAR. Equivalent test 1106 checks not value 1 but value 6 of the gear ratio engaged, while the operation equivalent to operation 1107 consists of making the display the higher number instead of the lower number. Furthermore, during the tests which are equivalent to tests 1109 and 1111 the values of the range of speeds of the table corresponding to the higher gear ratio are examined.

What is claimed is:

1. A motor vehicle drive device comprising:

an internal combustion drive engine whose revs can be controlled via an accelerator pedal; and a transmission, said transmission comprising:

a gearbox, a torque converter, a clutch coupled between said engine and said gearbox, said gearbox being of the type in which the shifts of the gear ratios are carried out without the aid of synchronizers, said gearbox comprising a primary shaft, a secondary shaft, sets of pinions wedged respectively on said shafts so as to be able to be selectively engaged with their respective shaft in order to assure the establishment of the gear ratios, the engaging and disengaging movements of said pinions being assured via a mechanical switching device comprising a gear ratio selector shaft having a plurality of predetermined angular positions comprising alternatively neutral positions, corresponding to disengaged positions of said pinions, and gear ratio positions corresponding to respective engaged positions of said pinions for each establishing a respective gear ratio of said gearbox, the mechanical switching device further comprising a control shaft cooperating with said selector shaft to enable the selection to be made from any previous gear ratio to any subsequent gear ratio, and an electronic control device for said transmission, wherein said drive device further comprises:

means for rapidly increasing the revs of said internal combustion engine independently of the control exercised via said accelerator pedal and wherein, for controlling the down-shifting of said gearbox, into a lower gear ratio, said electronic control device comprises:

means for placing said selector shaft in a selected one of said neutral positions, said selected neutral position being adjacent to the lower gear ratio position, means for temporarily actuating said means for rapidly increasing the revs, means for monitoring said revs, and means for preventing said selector shaft from shifting to the lower gear ratio position except when said revs reach a value compatible with said lower gear ratio.

2. A drive device according to claim 1, wherein said electronic control device further comprises:

means for placing said selector shaft in a neutral position situated immediately below the position of the new gear ratio, in the direction of rotation of said shaft towards said new gear, prior to the shift of said gearbox from one gear ratio to another.

3. A drive device according to claim 1, wherein said electronic control device further comprises:

means for storing a first table of values, each value of said first table representing a permitted level of revs of said engine for a determined ratio of said gearbox, and means for comparing the engine revs, at each gear ratio shift, to the value of said first table which corresponds to the permitted level of revs for the gear ratio to be shifted into, and only permitting the shift to take place when the result of the comparison shows that the values are equal.

4. A drive device according to claim 1, wherein said electronic control device further comprises:

means for defining the gear ratio in which said gearbox must be engaged as a function of the travelling speed of said vehicle.

5. A drive device according to claim 4, wherein said electronic control device further comprises:

means for storing at least a second table of values containing a range of travelling speed values of said vehicle for each gear ratio of said gearbox, means for comparing the instant travelling sped of said vehicle with the values of said second table, means for generating angular position values of said selector shaft as a function of the result of said comparison, these position values respectively representing the gear ratios to be engaged, and means for bringing said selector shaft each time into the position corresponding to the gear ratio to be engaged, as a function of said position values.

6. A drive device according to claim 1, further comprising:

means for defining in the travel of said accelerator pedal at least a high part and a low part, means for generating a position signal when said accelerator pedal moves from one of said parts of its travel to another and vice versa, and wherein said electronic control device also comprises:

means for storing a third table of values containing, for each gear ratio, a range of travelling speed values of said vehicle, different from the range of travelling speed values of said second table, and means for carrying out said comparison of the speed values of either said second or said third tables of values, as a function of said position signal of said pedal.

7. A drive device according to claim 6, wherein said second and third tables contain, for the same gear ratios, different ranges of values.

8. A drive device according to claim 1, wherein said electronic control device comprises a microprocessor.

9. A drive device according to claim 2, wherein said electronic control device further comprises:

means for storing a first table of values, each value of said first table representing a permitted level of revs of said engine for a determined ratio of said gearbox, and means for comparing the engine revs, at each gear ratio shift, to the value of said first table which corresponds to the permitted level of revs of the gear ratio to be shifted into, and only permitting the shift to take place when the result of the comparison shows that the values are equal.

10. A method for down-shifting from a higher gear ratio to a lower gear ratio in a motor vehicle drive device comprising:

an internal combustion drive engine whose revs can be controlled manually via an accelerator pedal; and a transmission, said transmission comprising:

a gearbox, a clutch coupled between said engine and said gearbox, said gear box being of the type in which the shifts of the gear ratios are carried out without the aid of synchronizers, said gearbox comprising a primary shaft, a secondary shaft, sets of pinions wedged respectively on said shafts so as to be able to be selectively engaged with their respective shaft in order to assure the establishment of the gear ratios, the engaging and disengaging movements of said pinions being assured via a mechanism switching device comprising a gear ratio selector shaft having a plurality of predetermined angular positions comprising alternatively neutral positions, corresponding to disengaged positions of said pinions, and gear ratio positions corresponding to respective engaged positions of said pinions for each establishing a respective gear ratio of said gearbox, the mechanical switching device further comprising a control shaft cooperating with said selector shaft to enable the selection to be made from any previous gear ratio to any subsequent gear ratio, bypass means for rapidly increasing the revs of said engine independently of the control exercised via said accelerator pedal, and an electronic control device for controlling said transmission, said method comprising the step of operating said electronic control device to control automatically the successive steps of:

disengaging said clutch;

opening said bypass means for rapidly increasing the revs of said engine, and placing said selector shaft in a selected one of said neutral positions, said selected neutral position being adjacent to the lower gear ratio position;

monitoring said engine revs;

engaging said clutch, when said engine revs have reached a predetermined permitted level, disengaging said clutch, placing said selector shaft in the lower gear ratio position, engaging said clutch and closing said bypass means.

* * * * *